United States Patent
Winfree et al.

(10) Patent No.: US 12,205,270 B2
(45) Date of Patent: Jan. 21, 2025

(54) METHOD OF IN-PROCESS DETECTION AND MAPPING OF DEFECTS IN A COMPOSITE LAYUP

(71) Applicant: The Boeing Company, Chicago, IL (US)

(72) Inventors: Troy Winfree, Seattle, WA (US); Sayata Ghose, Sammamish, WA (US); Brice A. Johnson, Federal Way, WA (US); Dustin Fast, Owens Cross Roads, AL (US)

(73) Assignee: The Boeing Company, Arlington, VA (US)

( * ) Notice: Subject to any disclaimer, the term of this patent is extended or adjusted under 35 U.S.C. 154(b) by 527 days.

(21) Appl. No.: 17/401,149

(22) Filed: Aug. 12, 2021

(65) Prior Publication Data

US 2023/0051895 A1   Feb. 16, 2023

(51) Int. Cl.
*G06T 7/00*   (2017.01)
*B29C 70/34*   (2006.01)
(Continued)

(52) U.S. Cl.
CPC .............. *G06T 7/001* (2013.01); *B29C 70/34* (2013.01); *B29C 70/54* (2013.01); *B29C 73/24* (2013.01);
(Continued)

(58) Field of Classification Search
CPC ........... G06T 7/001; G06T 7/12; G06T 7/344; G06T 2207/10048; G06T 2207/20081;
(Continued)

(56) References Cited

U.S. PATENT DOCUMENTS 7,513,964 B2   4/2009 Ritter
10,872,391 B2   12/2020 Juarez
(Continued)

OTHER PUBLICATIONS

Chen et al., Intelligent Inspection System Based on Infrared Vision for Automated Fiber Placement, Proceedings of 2018 IEEE International Conference on Mechatronics and Automation, Aug. 5-8, Changchun, China (Year: 2018).*
(Continued)

*Primary Examiner* — Said M Elnoubi

(57) ABSTRACT

A method of detecting defects in a composite layup includes capturing, using an infrared camera, reference images of a reference layup being laid up by a reference layup head. The method also includes manually reviewing the reference images for defects, and generating reference defect masks indicating defects in the reference images. The method further includes training, using the reference images and reference defect masks, a neural network, creating a machine learning model that, given a production image as input, outputs a production defect mask indicating the defect location and the defect type of each defect. The method also includes capturing, using an infrared camera, production images of a production layup being laid up by the production layup head, and applying the model to the production images to automatically generate a production defect masks indicating each defect in the production images.

20 Claims, 26 Drawing Sheets

(51) Int. Cl.
| | |
|---|---|
| *B29C 70/54* | (2006.01) |
| *B29C 73/24* | (2006.01) |
| *B32B 3/14* | (2006.01) |
| *B32B 3/18* | (2006.01) |
| *B32B 37/06* | (2006.01) |
| *B32B 37/10* | (2006.01) |
| *B32B 37/18* | (2006.01) |
| *B32B 38/18* | (2006.01) |
| *B32B 41/00* | (2006.01) |
| *G06T 7/12* | (2017.01) |
| *G06T 7/33* | (2017.01) |

(52) U.S. Cl.
CPC ............... *B32B 3/14* (2013.01); *B32B 3/18* (2013.01); *B32B 37/06* (2013.01); *B32B 37/10* (2013.01); *B32B 37/18* (2013.01); *B32B 38/1808* (2013.01); *B32B 41/00* (2013.01); *G06T 7/12* (2017.01); *G06T 7/344* (2017.01); *B32B 2041/04* (2013.01); *B32B 2309/72* (2013.01); *B32B 2605/18* (2013.01); *G06T 2207/10048* (2013.01); *G06T 2207/20081* (2013.01); *G06T 2207/20084* (2013.01); *G06T 2207/20132* (2013.01); *G06T 2207/30108* (2013.01)

(58) Field of Classification Search
CPC . G06T 2207/20084; G06T 2207/20132; G06T 2207/30108; G06T 2207/10016; G06T 2207/30124; G06T 2207/30164; B29C 70/34; B29C 70/54; B29C 73/24; B32B 3/14; B32B 3/18; B32B 37/06; B32B 37/10; B32B 37/18; B32B 38/1808; B32B 41/00; B32B 2041/04; B32B 2309/72; B32B 2605/18
See application file for complete search history.

(56) References Cited

U.S. PATENT DOCUMENTS

| | | | |
|---|---|---|---|
| 10,928,340 | B2 | 2/2021 | Johnson |
| 2020/0090326 | A1* | 3/2020 | Fahmi ............... A61B 6/037 |
| 2020/0094494 | A1 | 3/2020 | Johnson |
| 2020/0282668 | A1 | 9/2020 | Holmes |
| 2020/0380337 | A1* | 12/2020 | Shan ............... G06N 3/08 |
| 2022/0031394 | A1* | 2/2022 | Hufford ............ G16H 20/40 |
| 2022/0102121 | A1* | 3/2022 | Potocek ............ H01J 37/28 |

OTHER PUBLICATIONS

Shi et al., Computer Vision-Based Grasp Pattern Recognition With Application to Myoelectric Control of Dexterous Hand Prosthesis, IEEE Transactions on Neural Systems and Rehabilitation Engineering, vol. 28, No. 9, Sep. 2020. (Year: 2020).*

Bruning, "Machine Learning Approach for Optimization of Automated Fiber Placement Processes," 1st CIRP Conference on Composite Materials Parts Manufacturing, 2017.

Schmidt, "Thermal image-based monitoring for the automated fiber placement process," 10th CIRP Conference on Intelligent Computation in Manufacturing Engineering, 2016.

Denkena, "Thermographic online monitoring system for Automated Fiber Placement processes," Composites Part B 97 239-243, Apr. 24, 2016.

Juarez, "In Situ Thermal Inspection of Automated Fiber Placement Operations for Tow and Ply Defect Detection," Sampe, May 21, 2018.

Keras, "Image classification via fine-tuning with EfficientNet," available at <https://keras.io/examples/vision/image_classification_efficientnet_fine_tuning/>, retrieved on Jul. 21, 2021.

Keras, "InceptionV3," available at <https://keras.io/api/applications/inceptionv3/>, retrieved on Jul. 21, 2021.

Keras, "MobileNet and MobileNetV2," available at <https://keras.io/api/applications/mobilenet/#/mobilenetv2-function>, retrieved on Jul. 21, 2021.

Napari, "Multi-dimensional image viewer for python," available at <https://napari.org>, retrieved on Jul. 22, 2021.

Brownlee, "How to Manually Scale Image Pixel Data for DeepLearning," Machine Learning Mastery website, Mar. 25, 2019, available at <https://machinelearningmastery.com/how-to-manually-scale-image-pixel-data-for-deep-learning/>, retrieved on Jul. 24, 2021.

O'Mahony, "Deep Learning vs. Traditional Computer Vision," DOI:10.1007/978-3-030-17795-9_10, Computer Vision Conference (CVC) 2019.

Wikipedia, "Normalization (image processing)," retrieved on Jul. 22, 2021.

Chen Mengjuan et al: "Intelligent Inspection System Based on Infrared Vision for Automated Fiber Placement", 2018 IEEE International Conference on Mechatronics and Automation (ICMA), IEEE, Aug. 5, 2018, pp. 918-923.

Zambal Sebastian et al.: "End-to-end defect detection in automated fiber placement based on artificially generated data", SPIE Proceedings, ISSN 0277-786X, SPIE, US, vol. 11172, Jul. 16, 2019, pp. 111721 G-1-111721G-8.

EPO, Extended European Search Repor for Application No. 22179436.5, issued on Dec. 9, 2022.

Matlab,"Function fitting neural network," web page available at <https://www.mathworks.com/help/deeplearning/ref/fitnet.html 7/7>, retrieved on Mar. 14, 2024.

Packt,"Neural Networks with R," web page available at <https://subscription.packtpub.com/book/data/9781788397872/5/ch05lvl1sec57/data-fitting-with-neural-network>, retrieved on Mar. 14, 2024.

* cited by examiner

FROM FIG. 25A

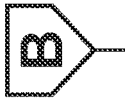

ALIGNING EACH PRODUCTION DEFECT MASK WITH A DIGITAL REPRESENTATION OF THE COURSES, RESULTING IN A DEFECT MAP CONTAINING AN ON-PART LOCATION AND THE DEFECT TYPE OF EACH DEFECT ASSOCIATED WITH THE COURSES ⎯ 312

PHYSICALLY LOCATING, USING THE DEFECT MAP, ONE OR MORE OF THE DEFECTS ASSOCIATED WITH THE COURSES, AND PERFORMING AT LEAST ONE OF THE FOLLOWING:
  REPAIRING ONE OR MORE OF THE DEFECTS PRIOR TO APPLYING SUBSEQUENT COURSES OF THE PRODUCTION LAYUP; AND
  ADJUSTING AT LEAST ONE LAYUP PROCESS CONTROL IN A MANNER MITIGATING SUBSEQUENT FORMATION OF DEFECTS OF THE SAME DEFECT TYPE AS THE DEFECTS INDICATED ON THE DEFECT MAP ⎯ 314

REPEATING THE FOLLOWING STEPS UNTIL ALL COURSES IN EACH COMPOSITE LAYER OF THE PRODUCTION LAYUP HAVE BEEN LAID UP: CAPTURING PRODUCTION IMAGES OF EACH COURSE, APPLYING THE MODEL TO THE PRODUCTION IMAGES TO GENERATE PRODUCTION DEFECT MASKS, ALIGNING EACH PRODUCTION DEFECT MASK WITH THE DIGITAL REPRESENTATION OF THE COURSE, USING THE DEFECT MAP TO PHYSICALLY LOCATE THE DEFECTS ASSOCIATED WITH THE COURSE, AND PERFORMING AT LEAST ONE OF THE FOLLOWING: REPAIRING THE DEFECTS, AND ADJUSTING AT LEAST ONE LAYUP PROCESS PARAMETER ⎯ 316

FIG. 25B

METHOD OF IN-PROCESS DETECTION AND MAPPING OF DEFECTS IN A COMPOSITE LAYUP

CROSS-REFERENCE TO RELATED APPLICATIONS

This nonprovisional patent application is related to contemporaneously filed U.S. nonprovisional patent application Ser. No. 17/401,138, entitled METHOD AND SYSTEM FOR IN-PROCESS MONITORING OF A COMPACTION ROLLER OF A COMPOSITE LAYUP MACHINE, and filed on Aug. 12, 2021, the contents of which are hereby incorporated by reference in its entirety. By mention in this CROSS-REFERENCE TO RELATED APPLICATIONS section, the application Ser. No. 17/401,138 is not admitted to be prior art.

FIELD

The present disclosure relates generally to composites manufacturing and, more specifically, to a method of in-process detection and mapping of defects in a composite layup.

BACKGROUND

Composite structures are used in a wide variety of applications, including in aircraft, due to their high strength-to-weight ratios, corrosion resistance, decreased weight, and other favorable properties. Furthermore, composite materials provide increased service life for various structures of an aircraft. In particular, in aircraft manufacturing, composite structures may be used to form the fuselage, wings, tail sections, and other parts of the aircraft.

However, monitoring of composite material quality during the manufacturing process is challenging. Composite structures are typically manufactured by laying up multiple composite plies one-at-a-time over a layup tool. Composite layup heads, such as automated fiber placement heads, are typically used to automatically lay up each composite ply as a plurality of individual courses of tape or tows. The courses are sequentially applied to a substrate side-by-side, and parallel to each other. During the layup process, the composite layup must be monitored for issues that can affect the overall layup quality. For example, the composite layup must be monitored for the presence of defects such as twists, folds, gaps, and overlaps in the tows of composite material. Other defects that can occur include missing tows, foreign object debris (FOD), fuzzballs, and low-quality tack between the tows and the substrate.

Traditional methods for monitoring a composite layup for defects include visual inspection by quality-assurance (QA) personnel of each composite ply after it is laid up. Although generally effective, visual inspection by QA personnel is a qualitative measure of the composite layup, and is therefore subject to human error. Furthermore, when QA personnel conduct a visual inspection of a composite ply, the operation of the composite layup head must be temporarily halted. Due to the amount of time required to visually inspect each composite ply in a multi-ply layup, the visual inspection method has a significant impact on the overall production rate.

Another method of monitoring the quality of a composite layup during manufacturing is an in-process, image-based method. However, such method relies on classical machine vision algorithms involving edge detection and heuristics-based decision making. The machine vision method requires the complex setup of equipment, including mounting and positioning multiple cameras. In addition, the machine vision method requires time-consuming and build-specific pre-programming of intended tow-edge locations, expected heat gradients, and allowable deviations. Furthermore, the machine vision method is constrained by the quality of the specific heuristics and the computational complexity of classical algorithms, resulting in less-than-ideal detection confidence, and limitations on the range of defect types that can be detected. The machine vision method also requires that the layup head operates below a certain speed threshold, which has a negative impact on production rate.

As can been seen, there exists a need in the art for a method of inspecting a composite layup that minimizes the amount of time that the operation of the layup head must be halted, requires a minimal amount of equipment setup and pre-programming, is computationally efficient, and is not build-specific.

SUMMARY

The above-noted needs associated with inspection of composite layups are addressed by the present disclosure, which provides a method of in-process detection of defects in a composite layup. The method includes capturing, using an infrared camera of a reference layup head, a series of reference images of a course of a reference layup being laid up by the reference layup head. The method additionally includes manually reviewing the reference images for defects, and generating, for each reference image containing a defect, a reference defect mask indicating a defect location and identifying a defect type of each defect in the reference image. The method also includes training, using the reference images and corresponding reference defect masks, an artificial neural network to perform segmentation in a manner creating a machine learning defect identification model that, given a production image as input, outputs a production defect mask indicating the defect location and the defect type of each defect detected by the model. The method further includes capturing, using an infrared camera of a production layup head, a series of production images of at least one course of a production layup being laid up by the production layup head. In addition, the method includes applying the model to the production images, and automatically generating, for each production image containing a defect, a production defect mask indicating the defect location and identifying the defect type of each defect detected by the model.

Also disclosed is a method of in-process detection of defects in a composite layup, comprising capturing, using one or more infrared cameras of a reference layup head, a series of reference images of a course of a reference layup being laid up by the reference layup head, the course comprising a plurality of tows in side-by-side relation to each other. The method also includes manually reviewing the reference images for defects, and generating, for each reference image containing a defect, a reference defect mask indicating tow boundaries and a unique tow identification number for each tow in the course, and a defect location and identifying a defect type of each defect in the reference image. The method further includes training, using the reference images and corresponding reference defect masks, an artificial neural network to perform instance segmentation in a manner creating a machine learning defect identification model that, given a production image as input, outputs a production defect mask indicating the tow boundaries and tow identification number of each tow in the course, and the defect location and the defect type of each defect detected by the model. Furthermore, the method includes capturing, using one or more infrared cameras of a production layup head, a series of production images of one or more courses of tows of a production layup being laid up by the production layup head. In addition, the method includes applying the model to the production images, and automatically generating, for each production image containing a defect, a production defect mask indicating the defect type, identifying the defect location along a lengthwise direction of the course, and indicating the tow identification number of one or more of the tows containing the defect.

In addition, disclosed is a method of in-process mapping of defects in a composite layup, comprising manually generating, using an image annotation software program, a reference defect mask for each of a plurality of reference images of a course of a reference layup during application by a reference layup head onto a substrate. Each reference image shows at least one defect in the course. The method also includes training, using the reference images and corresponding reference defect masks, an artificial neural network to perform instance segmentation in a manner creating a machine learning defect identification model that, given a production image as input, outputs a production defect mask indicating a defect location and a defect type of each defect detected by the model. The method additionally includes capturing, using an infrared camera of a production layup head, a series of production images of one or more courses of a production layup being laid up by the production layup head. Furthermore, the method includes applying the model to the production images in real time to automatically locate and classify defects in the course of the production layup.

The features, functions, and advantages that have been discussed can be achieved independently in various versions of the disclosure or may be combined in yet other versions, further details of which can be seen with reference to the following description and drawings.

BRIEF DESCRIPTION OF THE DRAWINGS

The disclosure can be better understood with reference to the following detailed description taken in conjunction with the accompanying drawings, which illustrate preferred and exemplary versions, but which are not necessarily drawn to scale. The drawings are examples and not meant as limitations on the description or the claims.

FIG. 25B is an illustration of a flowchart of a continued portion of the method of FIG. 25A.

The figures shown in this disclosure represent various aspects of the versions presented, and only differences will be discussed in detail.

DETAILED DESCRIPTION

Disclosed versions will now be described more fully hereinafter with reference to the accompanying drawings, in which some, but not all of the disclosed versions are shown. Indeed, several different versions may be provided and should not be construed as limited to the versions set forth herein. Rather, these versions are provided so that this disclosure will be thorough and fully convey the scope of the disclosure to those skilled in the art.

This specification includes references to "one version" or "a version." Instances of the phrases "one version" or "a version" do not necessarily refer to the same version. Similarly, this specification includes references to "one example" or "an example." Instances of the phrases "one example" or "an example" do not necessarily refer to the same example. Particular features, structures, or characteristics may be combined in any suitable manner consistent with this disclosure.

As used herein, "comprising" is an open-ended term, and as used in the claims, this term does not foreclose additional structures or steps.

As used herein, "configured to" means various parts or components may be described or claimed as "configured to" perform a task or tasks. In such contexts, "configured to" is used to connote structure by indicating that the parts or components include structure that performs those task or tasks during operation. As such, the parts or components can be said to be configured to perform the task even when the specified part or component is not currently operational (e.g., is not on).

As used herein, an element or step recited in the singular and preceded by the word "a" or "an" should be understood as not necessarily excluding the plural of the elements or steps.

As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

Figure 1:
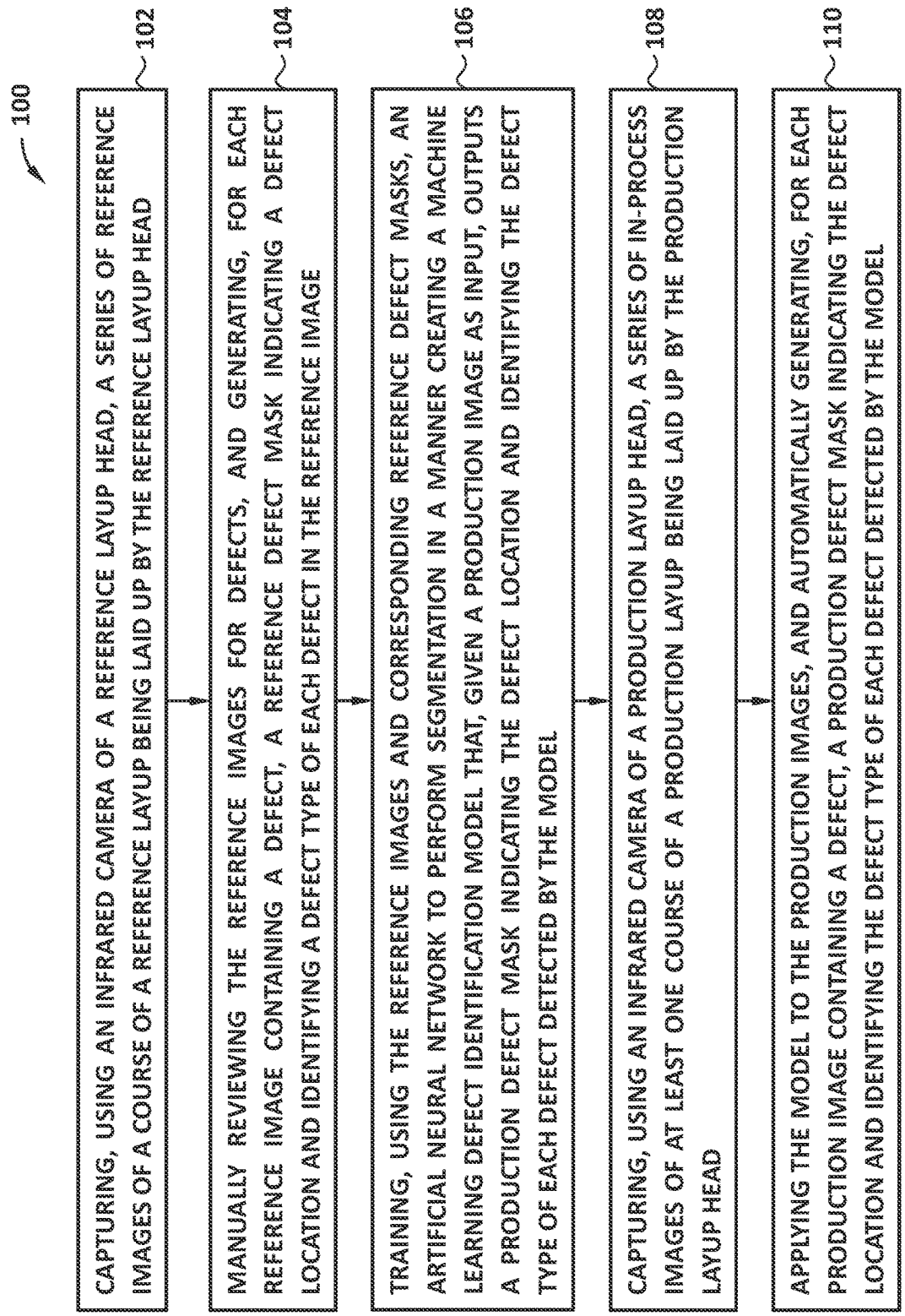
FIG. 1 is an illustration of a flowchart of an example of a method of in-process detection of defects in a composite layup.
Figure 3:
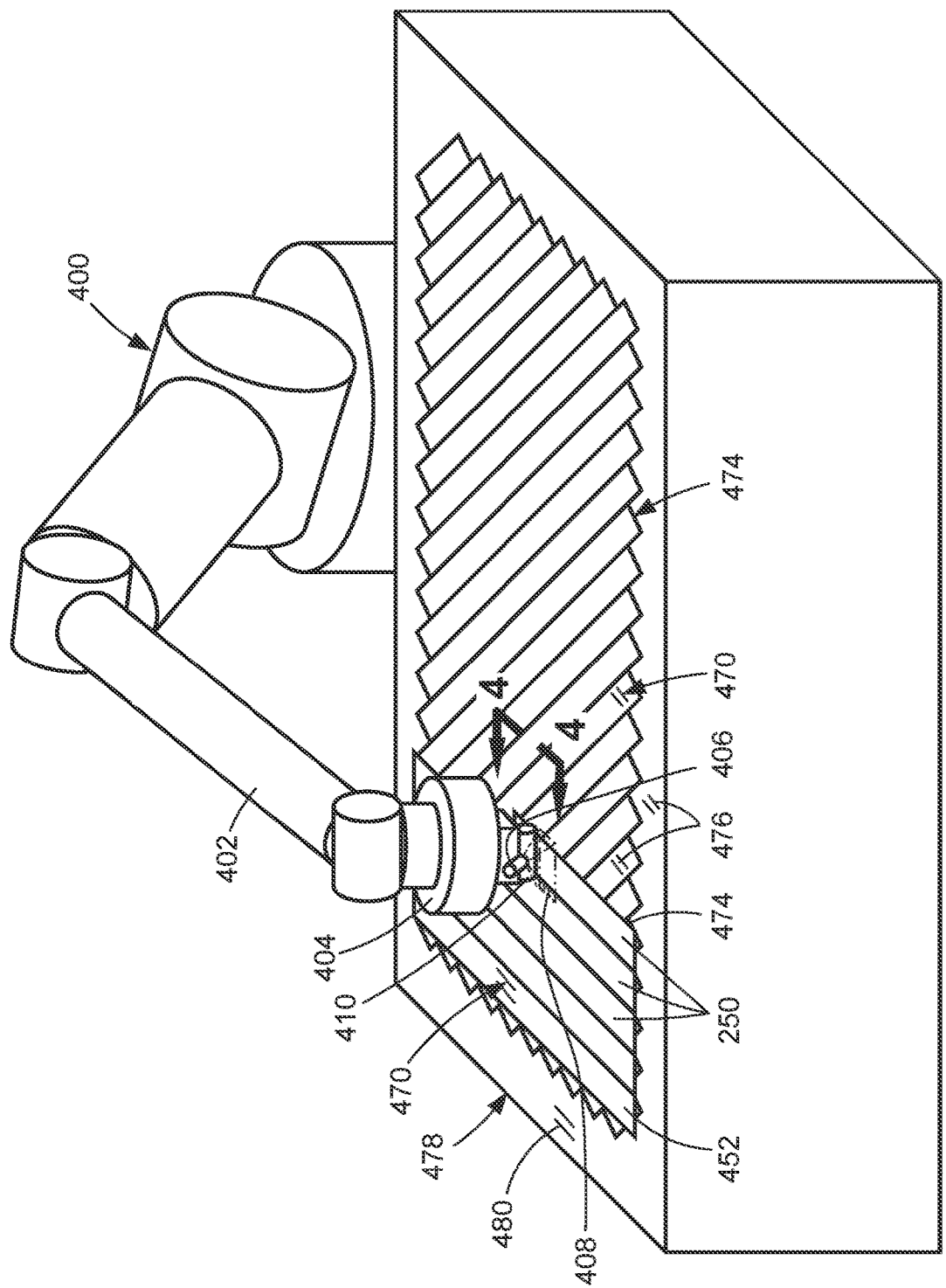
FIG. 3 shows an example of a reference layup head laying up a reference layup on a reference layup tool.
Figure 18:
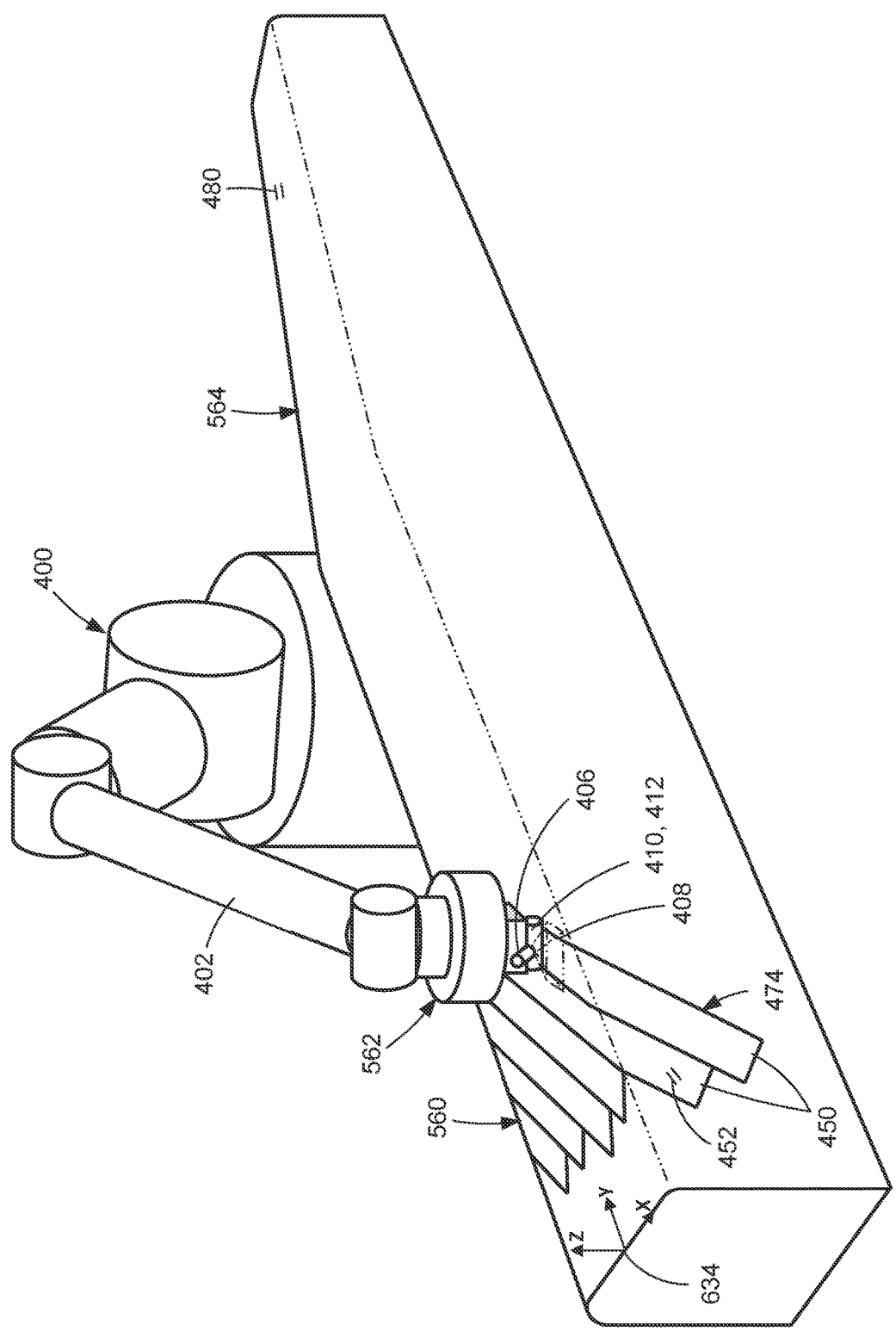
FIG. 18 is a perspective view of an example of a production composite layup as it is being laid up on a production layup tool by a production layup head.

Referring now to the drawings which illustrate preferred and various examples of the disclosure, shown in FIG. 1 is a method 100 of in-process detection of defects 508 (FIGS. 7-15) in a composite layup, such as the production layup 560 shown in FIG. 18. Referring to FIG. 3, the method 100 includes applying, via a reference layup head 404, a course 450 of composite material 452 onto a substrate 476. The course 450 is one of multiple courses 450 that are laid up sequentially, in parallel relation to each other, by the reference layup head 404 to form a composite ply 474. When completed, the reference layup 470 is made up of multiple composite plies 474 laid up on top of each other. In some examples, the substrate 476 is a tool surface 480 of a reference layup tool 478. In other examples, the substrate 476 is a composite ply 474, previously laid up by the reference layup head 404.

In FIG. 3, the reference layup 470 is a flat panel 472 laid up by a reference layup head 404 onto a reference layup tool 478 having a generally planar tool surface 480. The reference layup 470 may be laid up in a controlled environment, such as in a laboratory setting. Although shown as a flat panel 472, the reference layup 470 may be laid up in any one of a variety of different sizes, shapes, and configurations, as dictated by the size, shape, and configuration of the reference layup tool 478.

In FIG. 3, the reference layup head 404 is supported by a robotic arm 402 of a robotic device 400. However, in other examples not shown, the reference layup head 404 may be supported by an overhead gantry, or by any one of a variety of other support mechanisms for moving the reference layup head 404 relative to the substrate 476. Alternatively, the presently-disclosed methods may be implemented in an arrangement where the reference layup head 404 is stationary, and the substrate 476 (e.g., the reference layup tool 478) is moved relative to the reference layup head 404. As described in greater detail below, the reference layup head 404 may be an automated fiber placement (AFP) head as known in the art.

Figure 4:
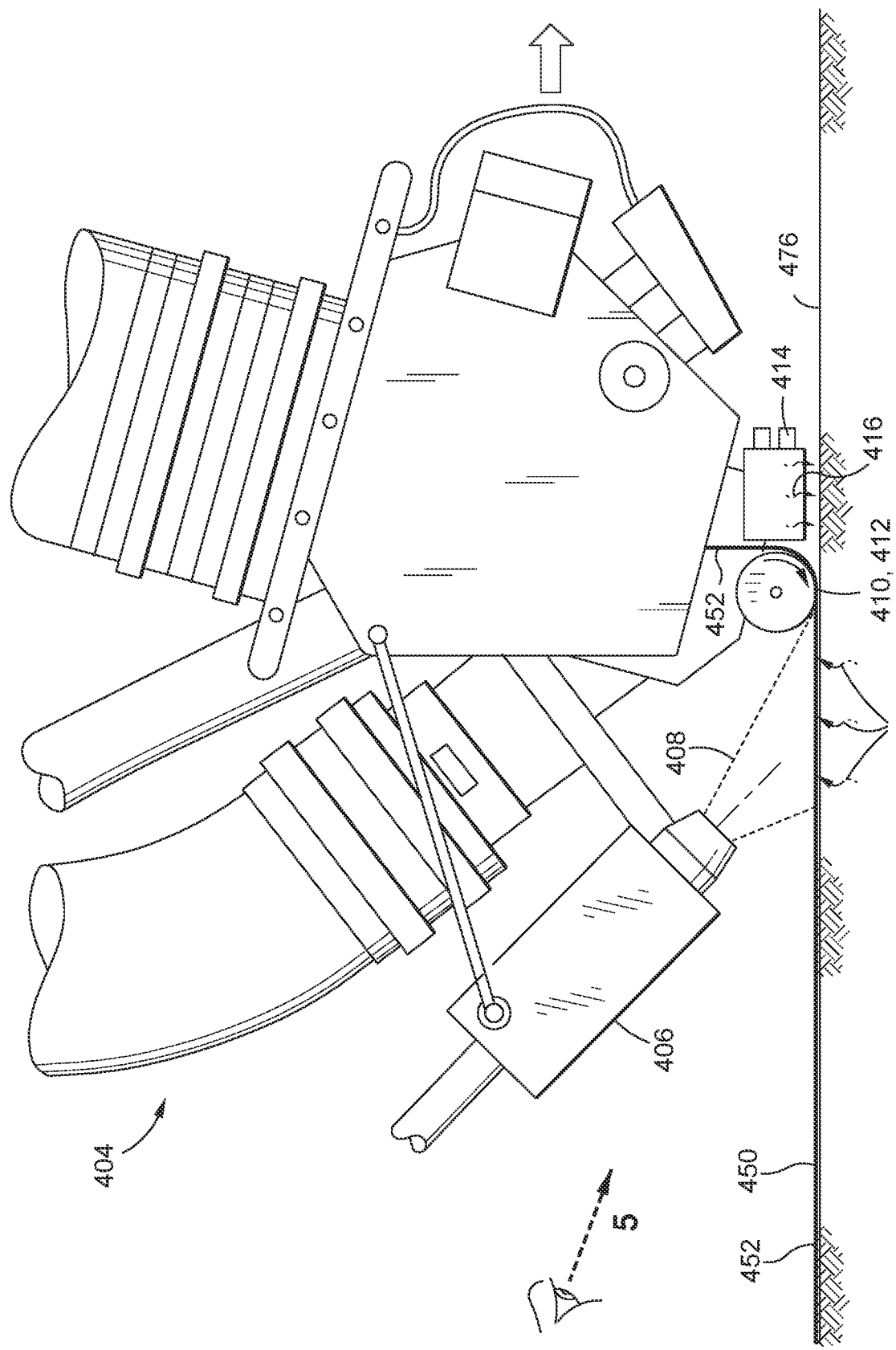
FIG. 4 is a side view of the reference layup head of FIG. 3.
Figure 5:
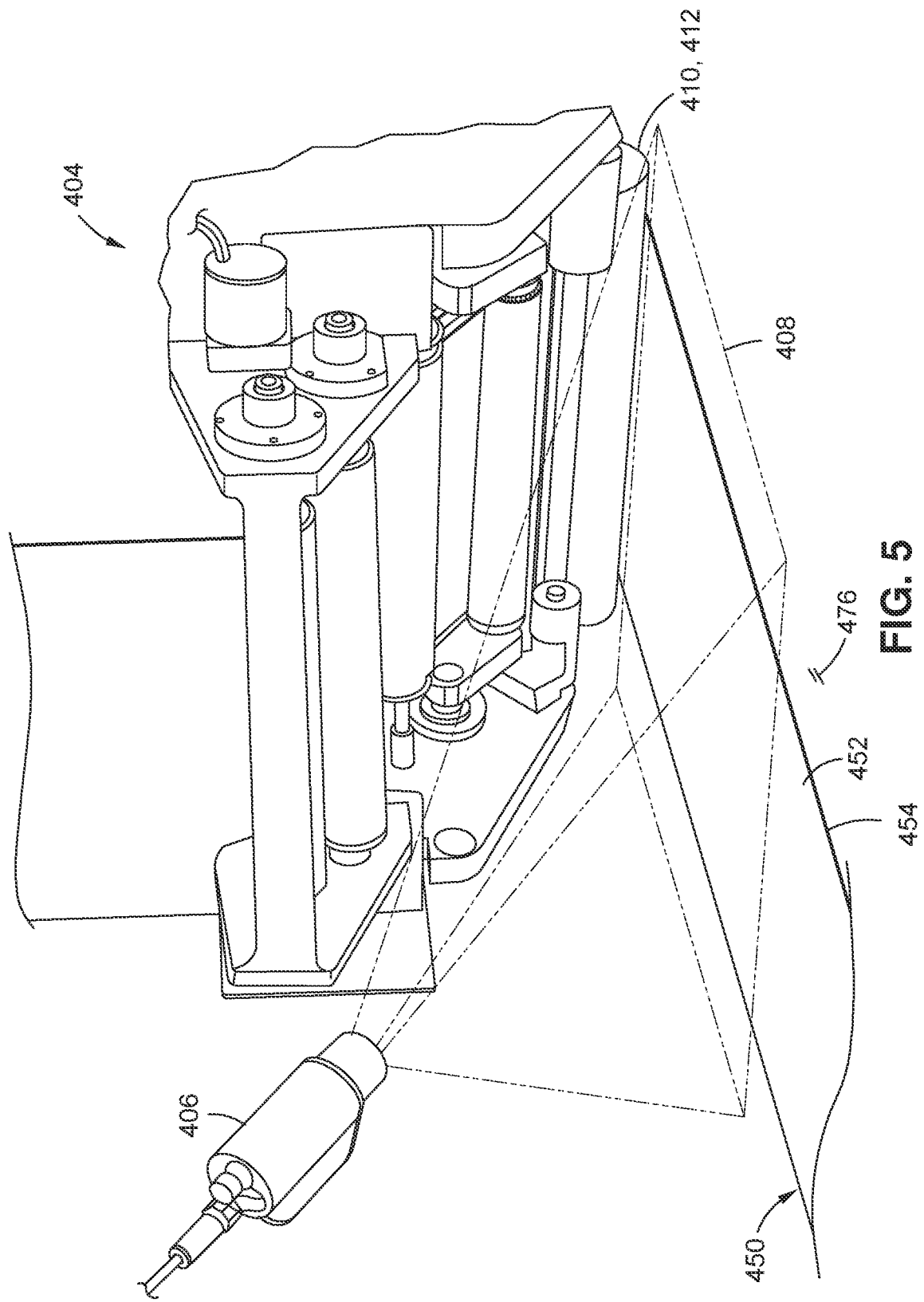
FIG. 5 is a perspective view taken along line 5 of FIG. 4, and showing the reference layup head dispensing a single-width tape of composite material onto a substrate.
Figure 6:
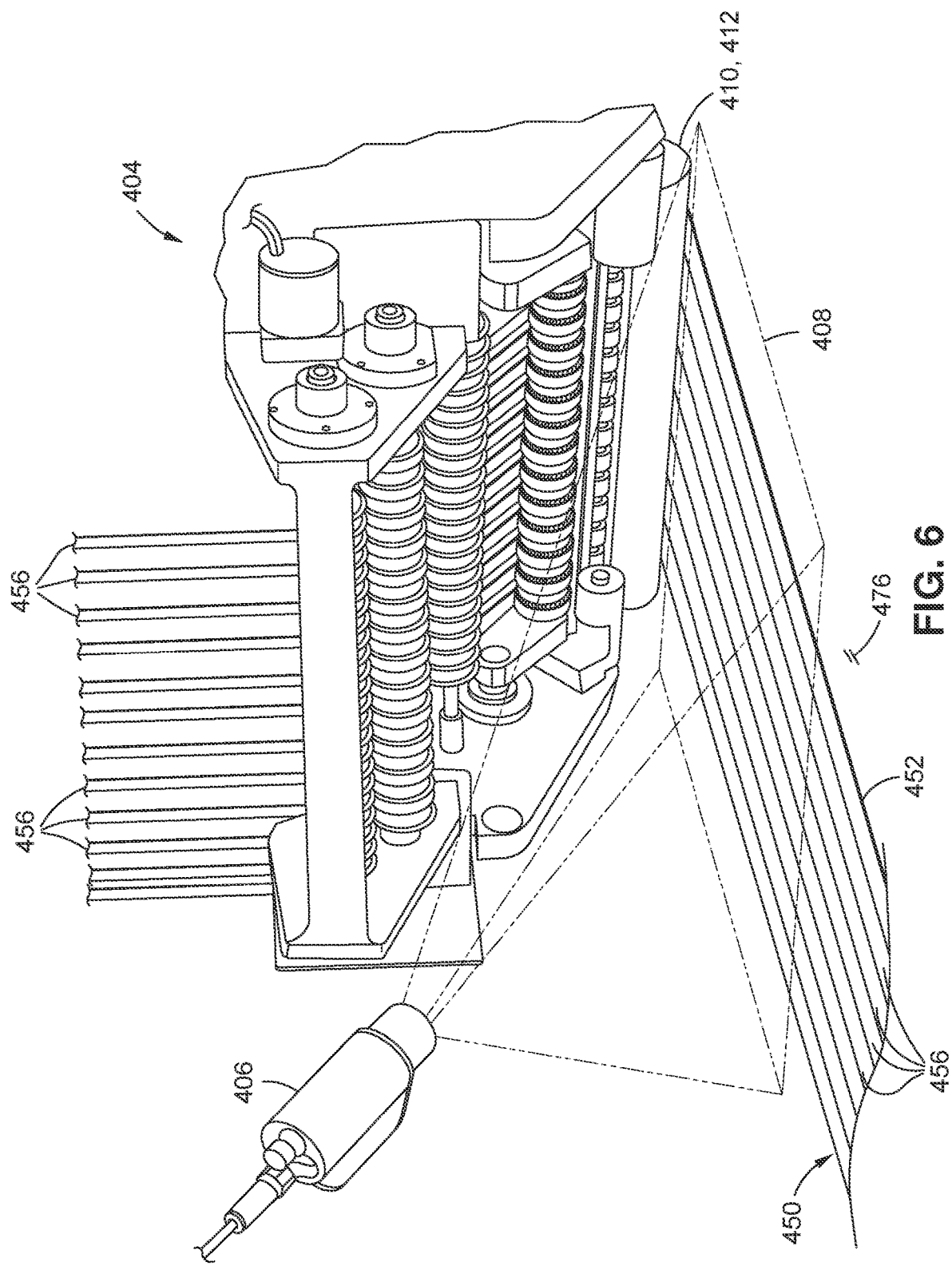
FIG. 6 is a perspective view of an example of a reference layup head dispensing side-by-side tows of composite material onto a substrate.

FIG. 4 is a side view of the reference layup head applying a course 450 onto a substrate 476. FIG. 5 shows the reference layup head 404 applying the course 450 onto the substrate 476 as a single-width tape 454 of composite material 452. FIG. 6 shows the reference layup head 404 applying the course 450 on the substrate 476 as an array of side-by-side tows 456, as described in greater detail below.

Referring to FIGS. 4-6, step 102 of the method 100 comprises capturing, using an infrared camera 406 of the reference layup head 404, a series of reference images 500 (e.g., FIGS. 7, 10, and 13) of the course 450 of the reference layup 470 being laid up by the reference layup head 404. The infrared camera 406 is mounted aft of a compaction device 410 of the reference layup head 404. The reference images 500 captured by the infrared camera 406 are infrared images. The compaction device 410 is configured to compact the course 450 against the substrate 476. The reference layup head 404 also includes a heating device 414 located forward of the compaction device 410. The heating device 414 is configured to apply heat 416 to the substrate 476 for improving the tack (e.g., adhesion) between the course 450 and the substrate 476.

Referring to FIGS. 7-15, step 104 of the method 100 comprises manually reviewing the reference images 500 for defects 508, and generating, for each reference image 500 containing a defect 508, a reference defect mask 504 (e.g., a pixel mask) indicating the defect location 510 and defect type 516 of each defect 508 in the reference image 500. In step 104, a technician (e.g., a domain expert) visually reviews each reference image 500 for defects 508. As described in greater detail below, examples of defect types 516 that may be detected by a technician include, but are not limited to, twists 518, folds 520, gaps 522, and overlaps 524 in the tape 454 or tows 456 of composite material 452 laid up on the substrate 476. Other defects 508 include missing tape or tows 532, foreign object debris 536, resin balls 538, fuzz balls 540, and low-quality tack 534.

As mentioned above, upon detecting a defect 508 in a reference image 500, the technician generates (e.g., via a computer) a reference defect mask 504 (e.g., a digital object) for the reference image 500. The reference defect mask 504 includes a defect boundary 511, such as a bounding box 512, generated by the technician to indicate the boundaries of each defect 508. In addition, for each defect 508, the technician applies a defect label 514 to the defect 508, identifying the defect type 516 (e.g., see FIGS. 8, 11, and 14). As described below, manual review of the reference images 500, and generation of the reference defect masks 504 may be performed by the technician in a computer-assisted manner using an image annotation software program.

Step 106 of the method 100 comprises training, using the reference images 500 (e.g., FIGS. 7, 10, and 13) and corresponding reference defect masks 504 (e.g., FIGS. 9, 12, and 15), an artificial neural network 600 (FIG. 16) to perform segmentation (e.g., either semantic image segmentation or instance segmentation) in a manner creating a machine learning defect identification model 602 (a model, e.g., FIG. 17) that, given a production image 566 (FIG. 20) as input, outputs a production defect mask 568 (FIGS.

20-22) indicating the defect location 510 and the defect type 516 of each defect 508 detected by the model 602. FIG. 18 shows a production layup head 562 in the process of laying up a production layup 560 on a production layup tool 564.

Figure 19:
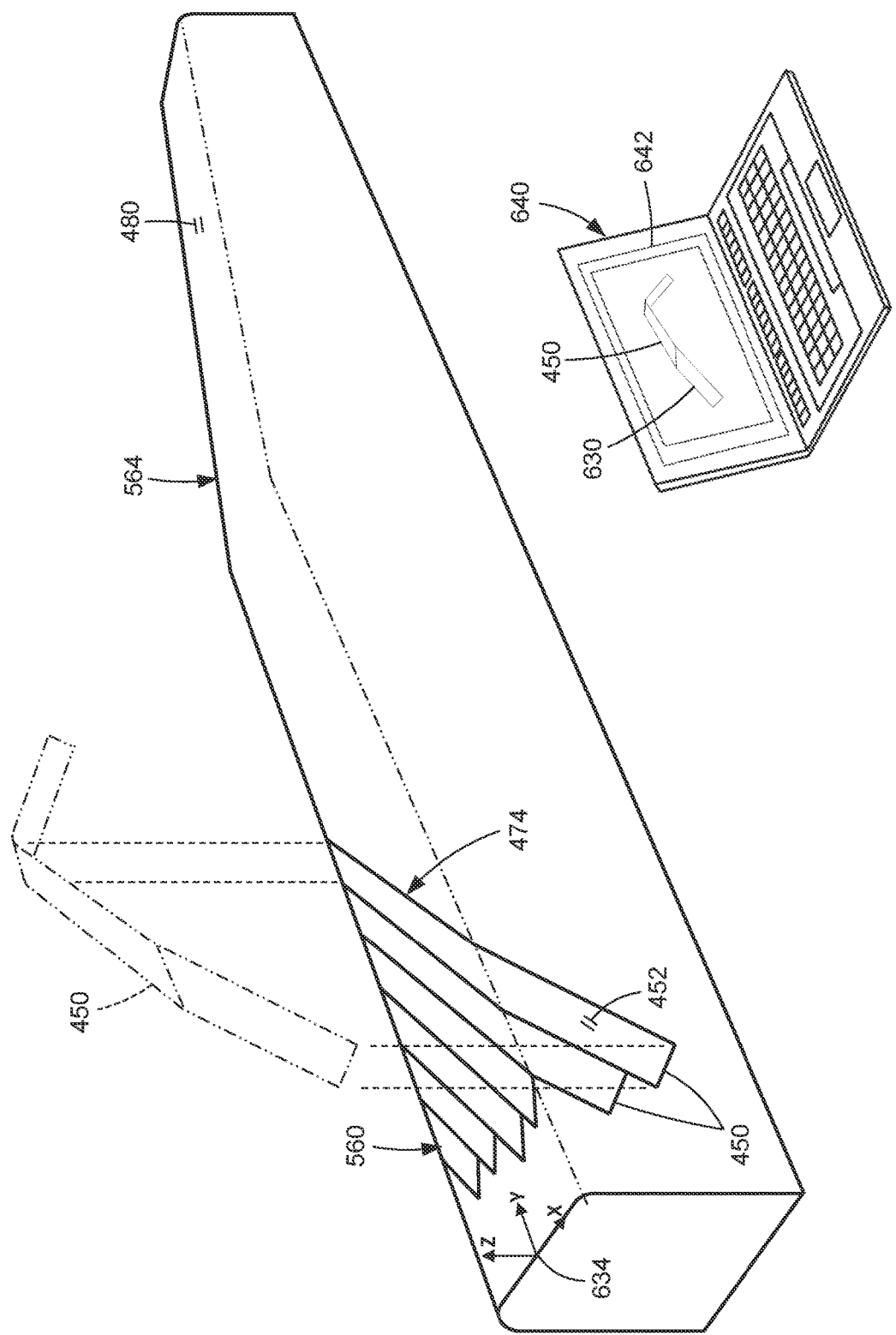
FIG. 19 shows one of the courses for which production images are submitted to the model.
Figure 20:
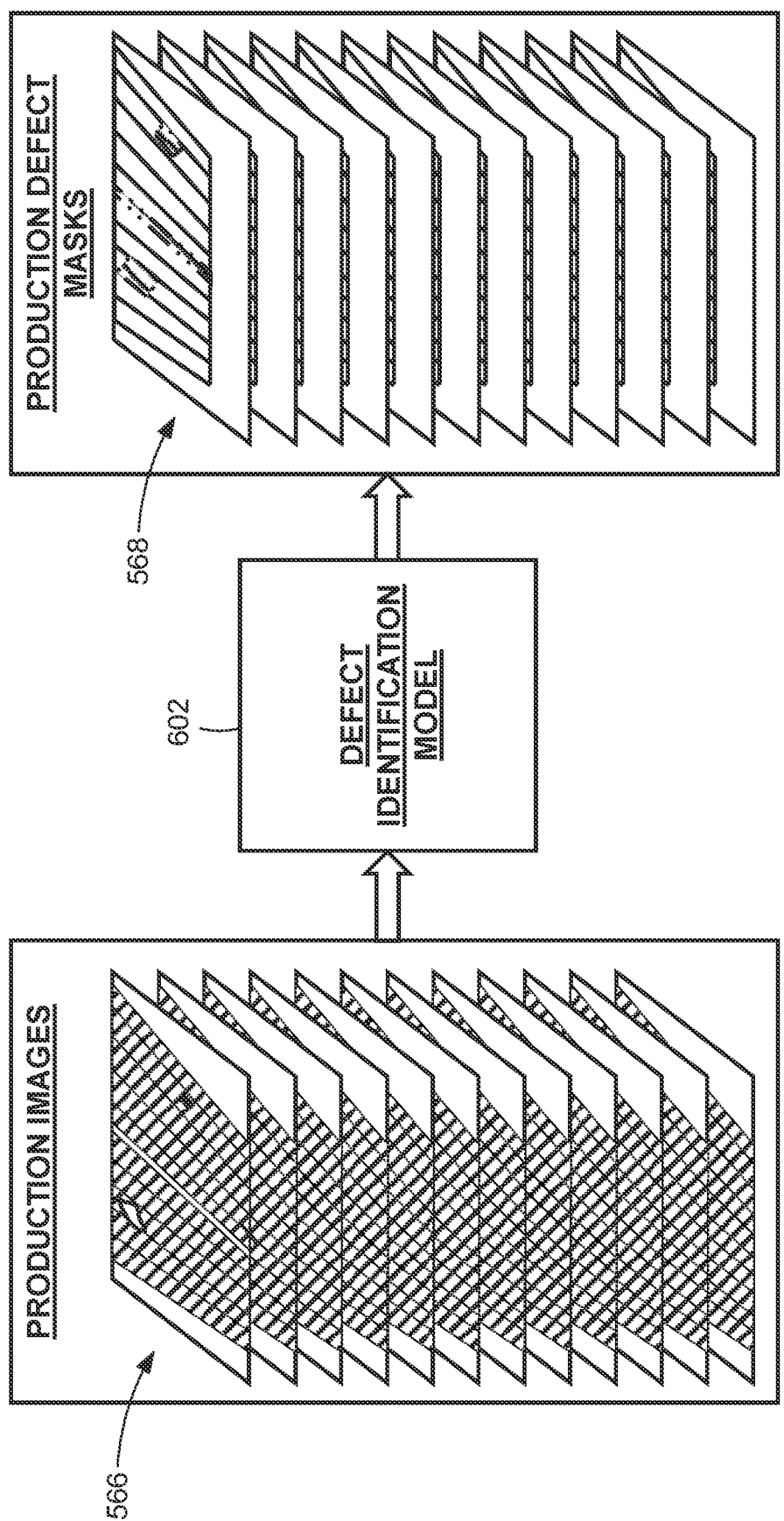
FIG. 20 is a schematic illustration of production images submitted to the model for generating production defect masks.

Referring to FIGS. 18-20, step 108 of the method 100 comprises capturing, using an infrared camera 406 of a production layup head 562, a series of production images 566 of a course 450 of a production layup 560 being laid up by the production layup head 562. In the example of FIG. 18, the production layup head 562 may be similar to, or different than, the above-mentioned reference layup head 404 (FIGS. 3-6). The infrared camera 406 is mounted to the production layup head 562 in a manner similar to the mounting of the infrared camera 406 to the reference layup head 404 in FIGS. 4-6, such that the field of view 408 of the infrared camera 406 is directed toward the region of the course 450 immediately aft of the compaction device 410.

Figure 9:
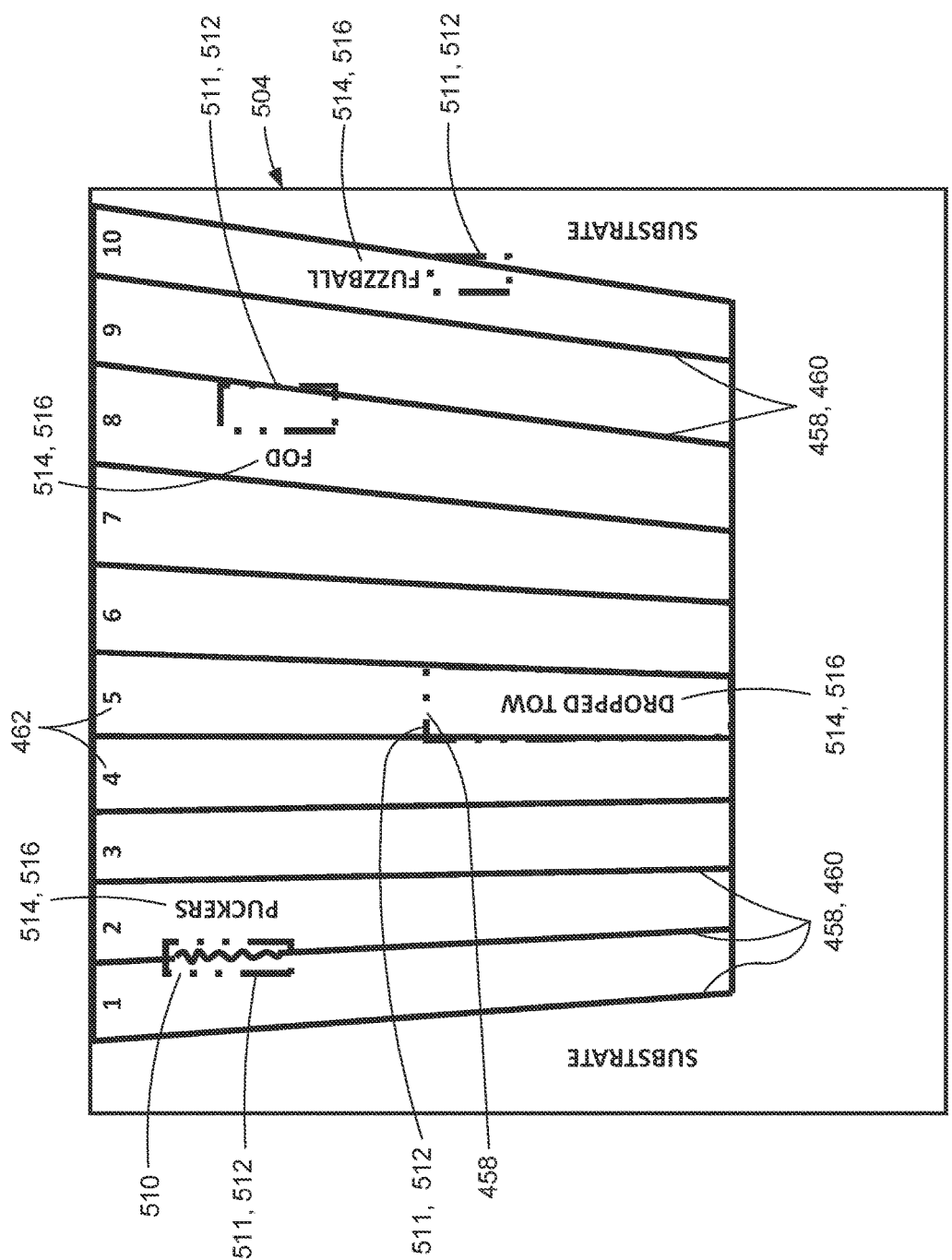
FIG. 9 shows the reference defect mask of FIG. 8.
Figure 12:
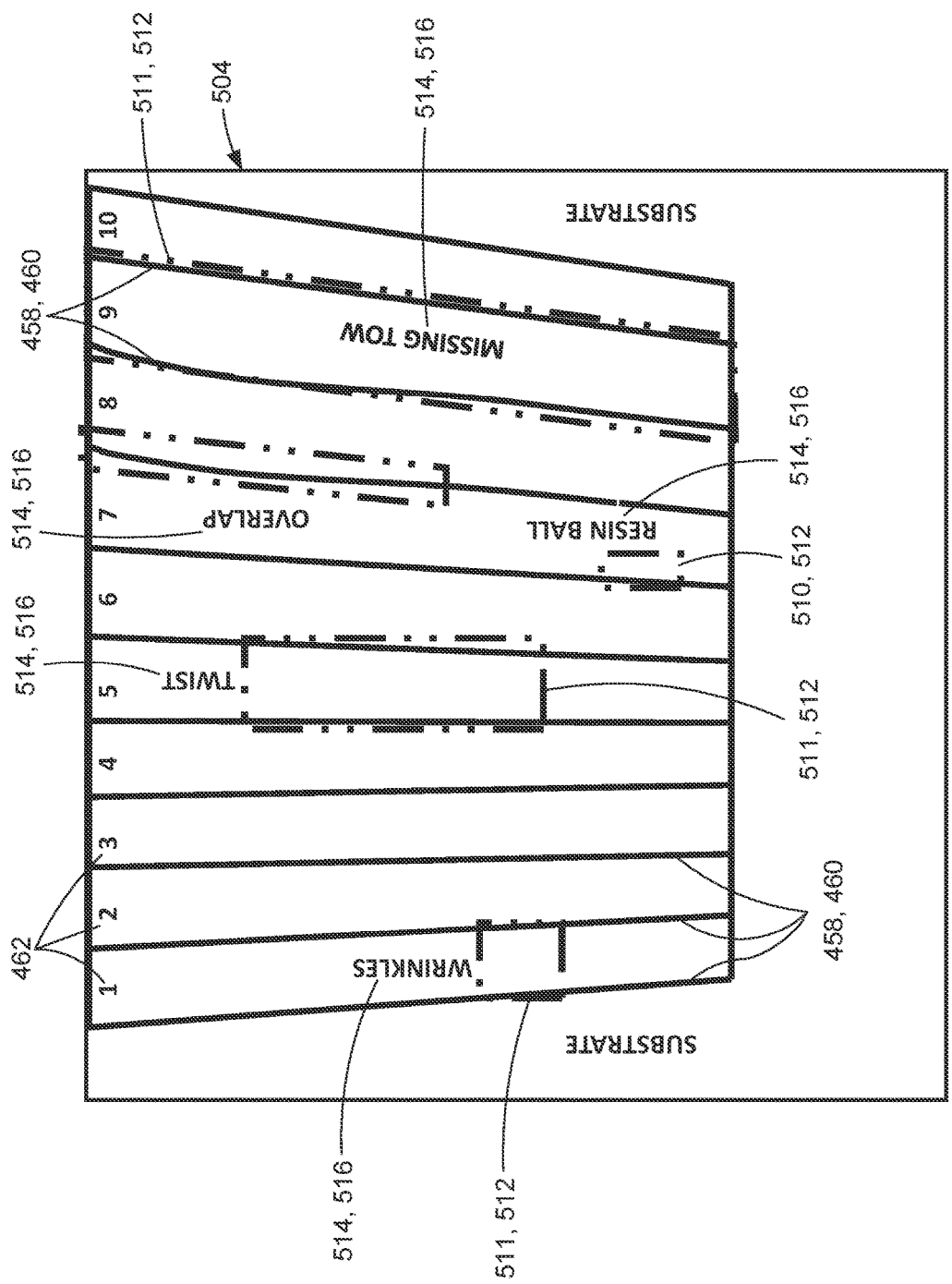
FIG. 12 shows the reference defect mask of FIG. 11.
Figure 15:
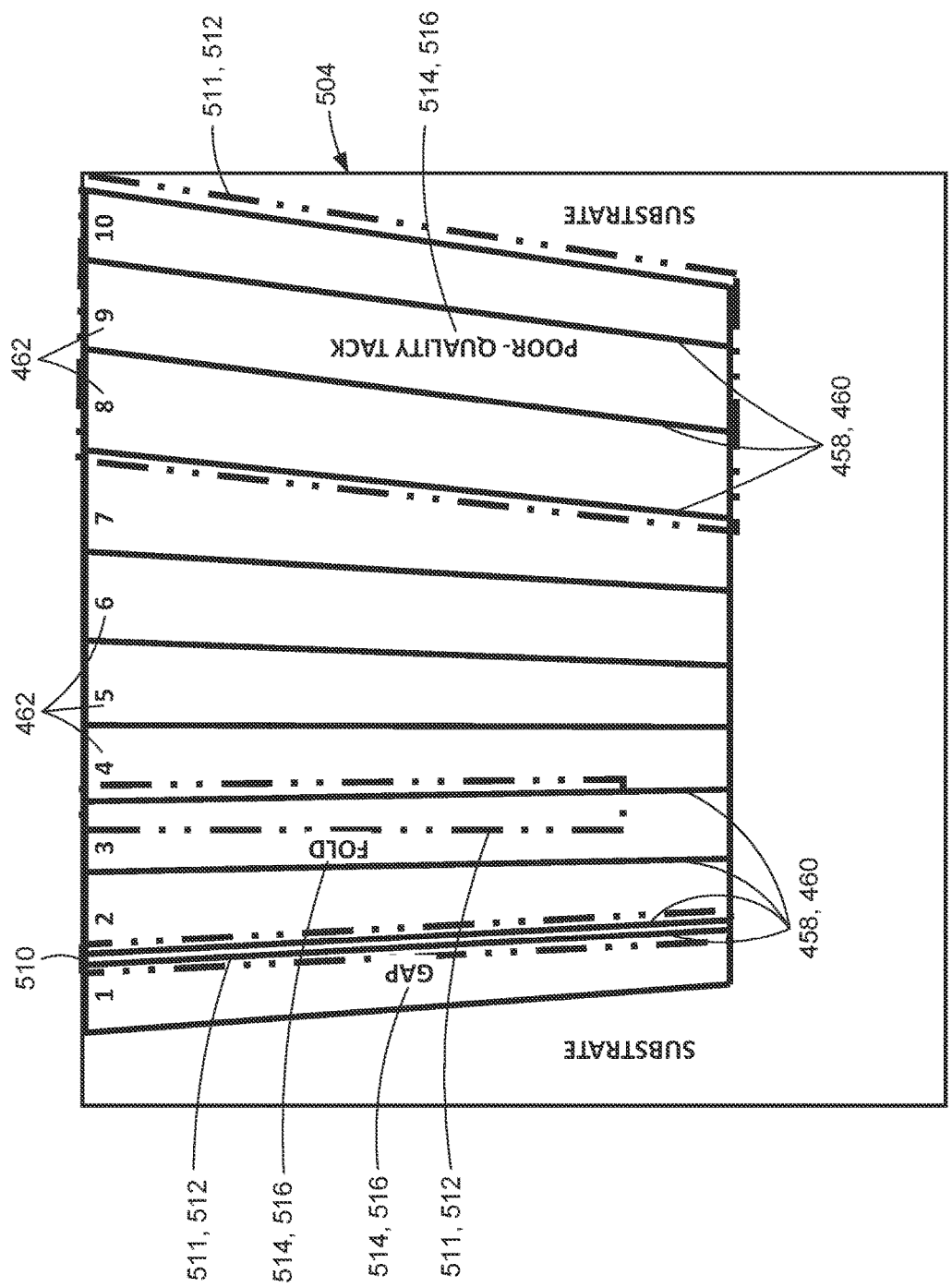
FIG. 15 shows the reference defect mask of FIG. 14.

Referring to FIGS. 9, 12, and 15, step 110 of the method 100 comprises applying the model 602 to the production images 566, and automatically generating (e.g., via the model 602), for each production image 566 containing a defect 508, a production defect mask 568 indicating the defect location 510 and the defect type 516 of each defect 508 detected by the model 602. FIG. 20 schematically illustrates an example of a series of production images 566 as inputs to the model 602. The model 602 may be applied to the production images 566 in real-time, during layup. The model 602 generates a production defect mask 568 for each production image 566 that contains at least one defect 508. The production defect masks 568 generated by the model 602 contain markings, such as bounding boxes 512, indicating the location of each defect 508, similar to the reference defect masks 504 in FIGS. 9, 12, and 15. The production defect masks 568 also include defect labels 514 identifying the defect type 516 of each defect 508 in each production image 566, similar to reference defect masks 504 shown in FIGS. 9, 12, and 15.

Figure 21:
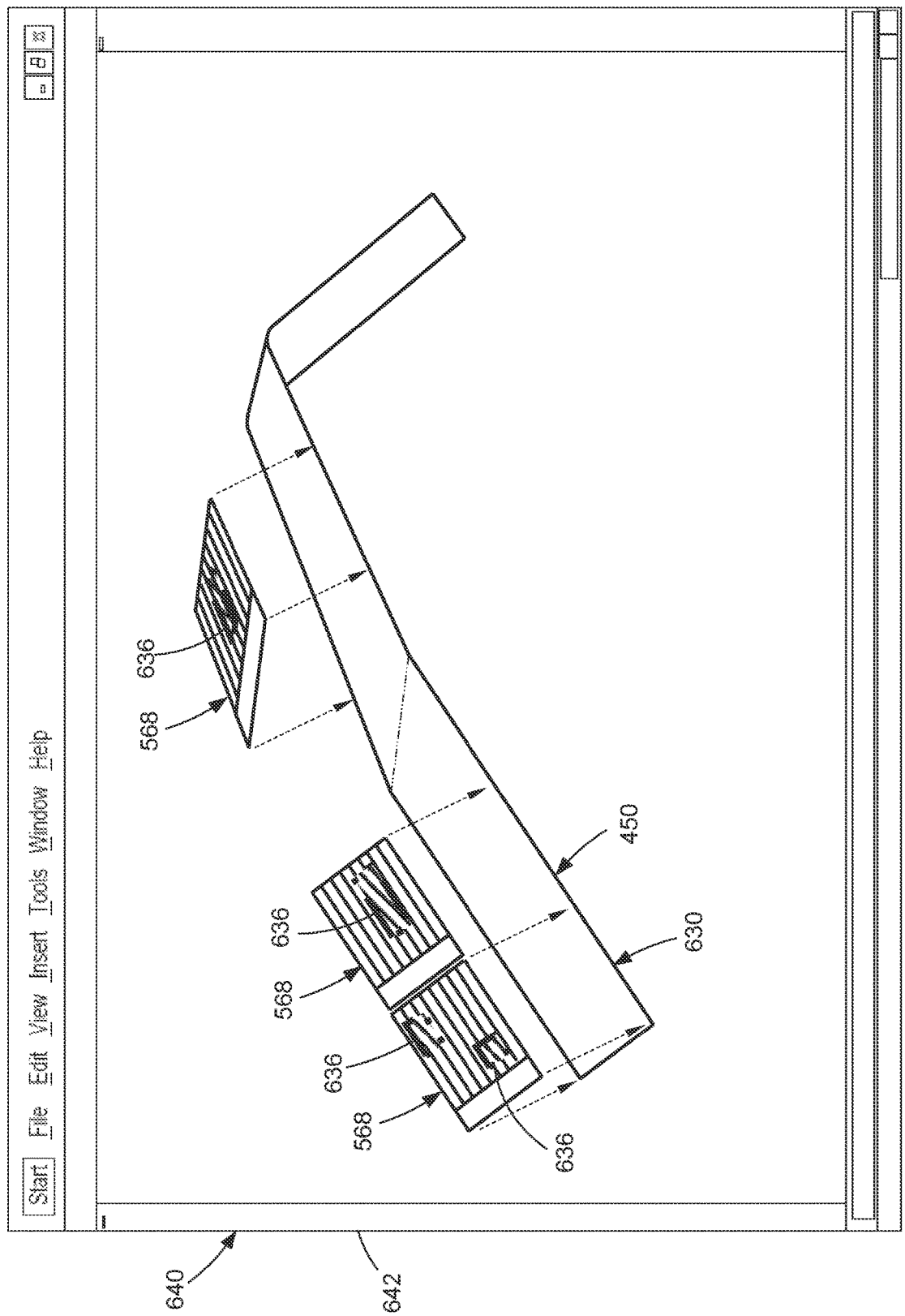
FIG. 21 shows a display screen of a computer during spatial alignment of production defect masks with a digital representation of the course of FIG. 19.
Figure 22:
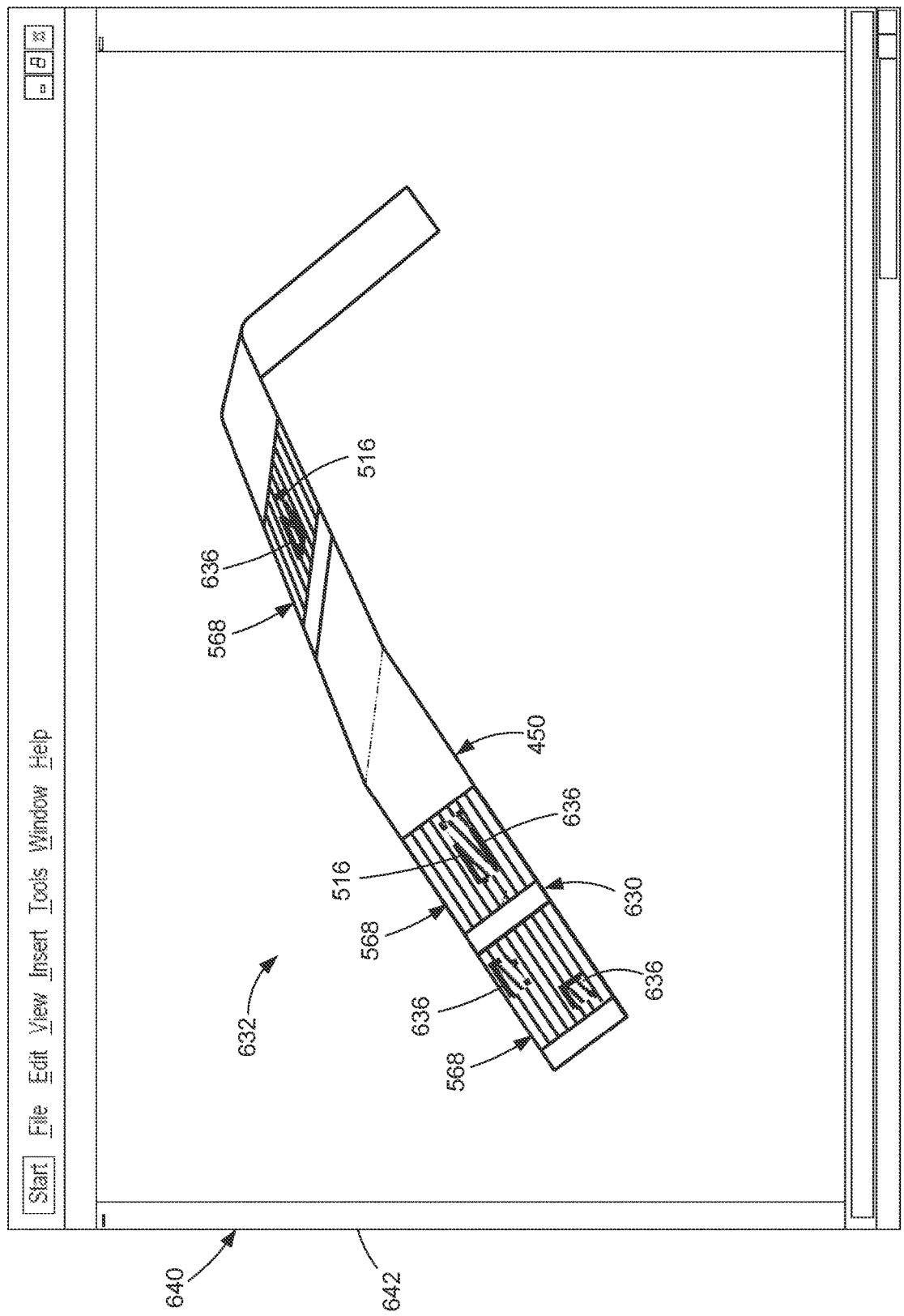
FIG. 22 shows the display screen of FIG. 21 illustrating the production defect masks spatially aligned with the digital representation of the course, and thereby forming a defect map.
Figure 23:
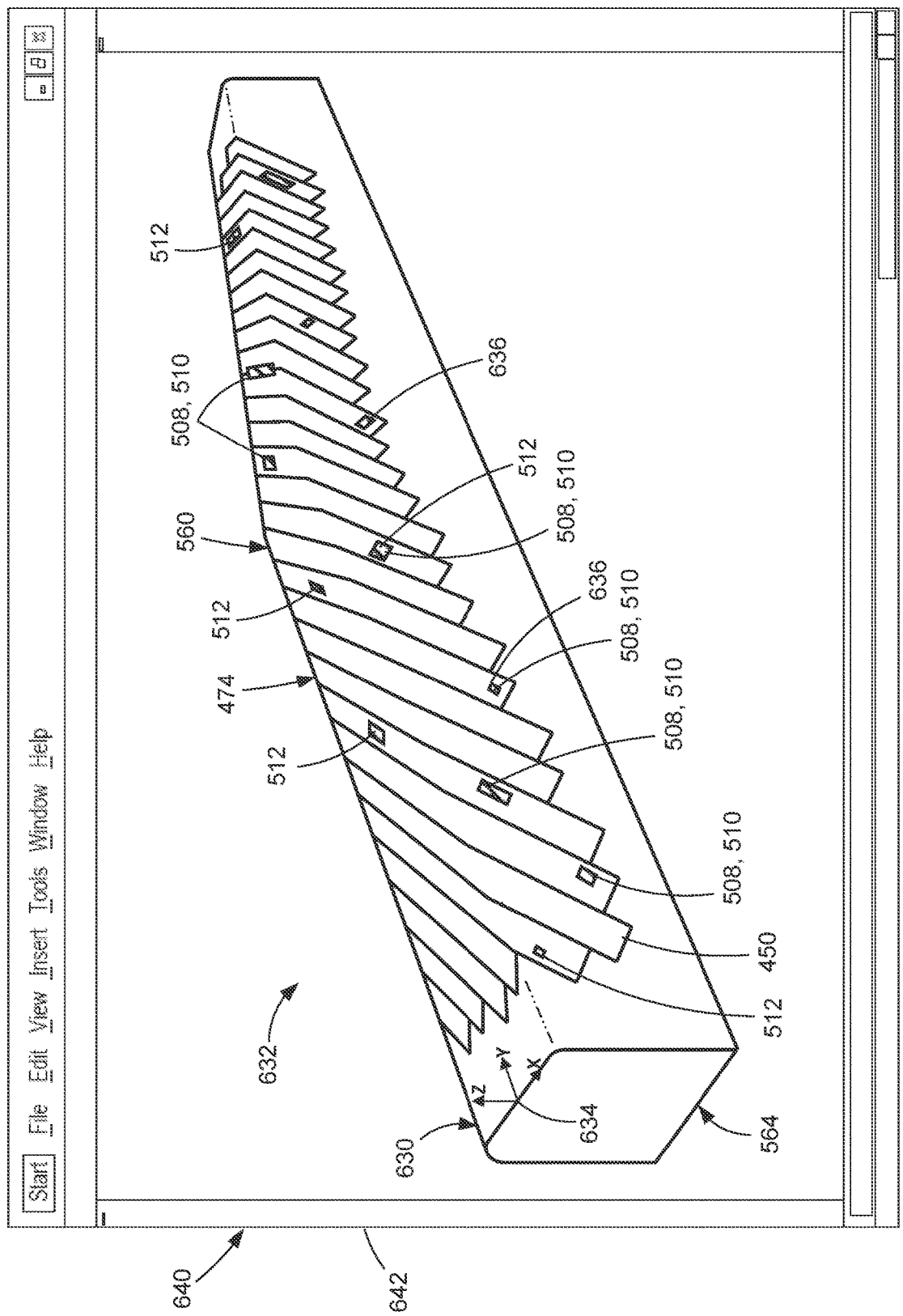
FIG. 23 shows the display screen illustrating a defect map containing the defect locations of a composite ply of the production layup of FIG. 18.

The method 100 of FIG. 1 additionally comprises spatially aligning each production defect mask 568 with a digital representation 630 of a region of the course 450 captured in the corresponding production image 566, as shown in FIGS. 20-21 and described in greater detail below. As a result of the spatial alignment of the production defect masks 568 with the digital representation 630 of the course 450, a defect map 632 is created. The defect map 632 includes a digital representation 630 of at least one course 450 of the production layup 560, and additionally includes the on-part location 636 and defect type 516 of each defect 508 associated with the course 450. FIG. 22 shows an example of a defect map 632 of a single course 450 of a composite ply 474 (FIG. 18) of the production layup 560 (FIG. 18). FIG. 23 shows an example of a defect map 632 of an entire composite ply 474 of the production layup 560.

Using the defect map 632, a technician (e.g., quality assurance (QA) personnel) can physically locate each defect 508 on the production layup 560, and physically examine the defect 508 to determine whether the defect 508 is acceptable or unacceptable. Based on the examination of the defect 508, a decision can be made as to whether to repair the defect 508 and/or adjust one or more layup process parameters to mitigate the further occurrence of the same defect type 516, as described in greater detail below.

Advantageously, the inspection methods disclosed herein eliminate time-intensive and costly inspection of the entire area of each composite ply 474 by QA personnel, replacing it with an automated process that quickly detects defects 508, and identifies the specific defect location 510 and defect type 516 during the layup process. As mentioned above and described in greater detail below, the presently disclosed methods embody a machine learning approach that can be performed using a single infrared camera 406, does not require prior knowledge of the composite layup build geometry, and is computationally efficient. As such, the presently-disclosed methods require a minimal amount of equipment setup and pre-programming, and are generalizable for a variety of different composite layup build geometries. Because the inspection performed by the presently disclosed methods occur in-process, downtime of the layup head is significantly reduced, relative to the significant amount of layup head downtime associated with traditional manual and/or out-of-process inspection methods.

Figure 2:
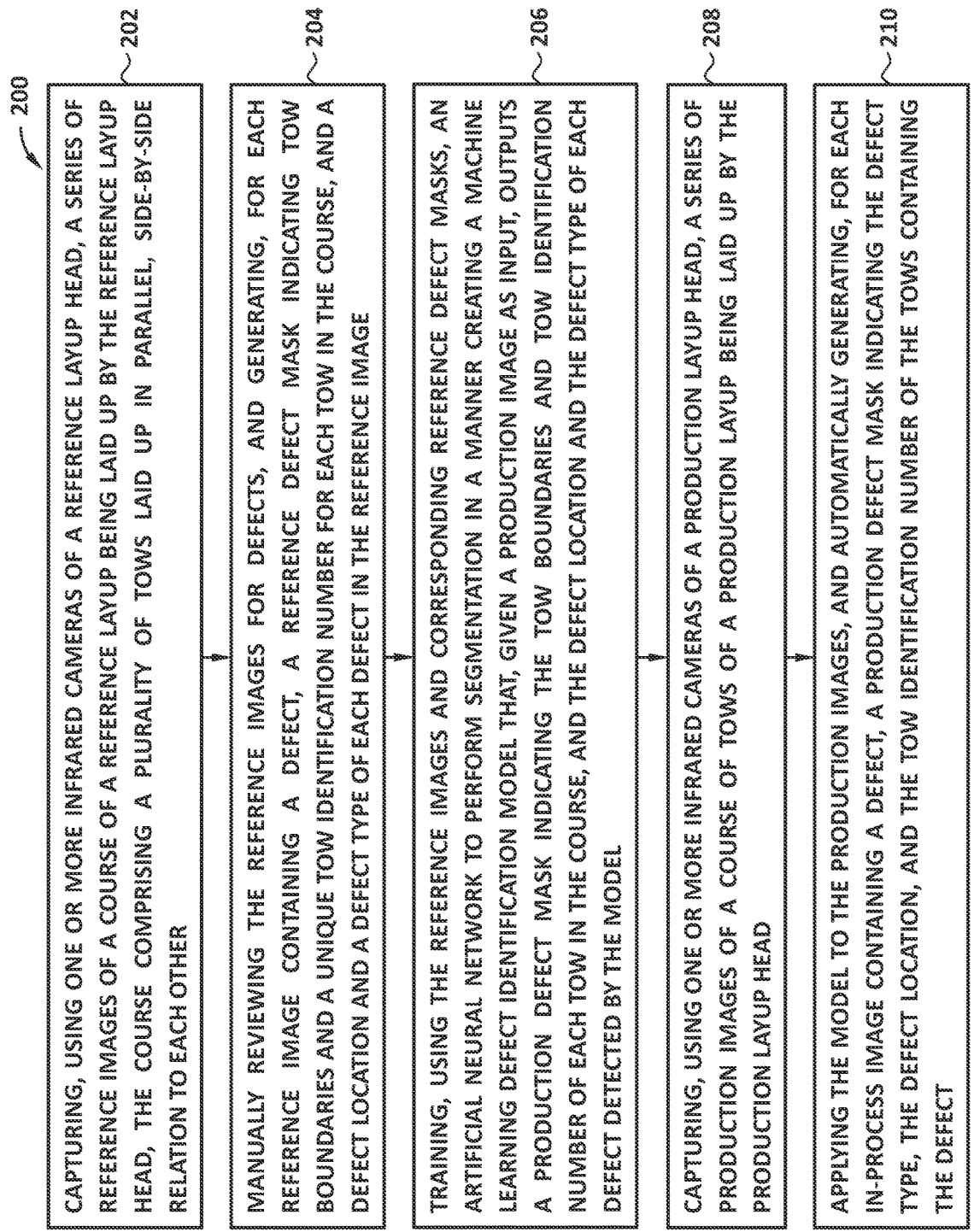
FIG. 2 is an illustration of a flowchart of a further example of a method of in-process detection of defects in a composite layup.

Referring now to FIG. 2, shown is a flowchart of a further method 200 of in-process detection of defects 508 in a composite layup, in which the reference layup head 404 dispenses the course 450 as side-by-side tows 456 of composite material 452, as shown in FIG. 6, which is in contrast to the reference layup head 404 of FIG. 5 which dispenses the course 450 as a single-width tape 454. In this regard, any one of the presently-disclosed methods 100, 200, 300 (FIGS. 25A-25B) of in-process detection and mapping of defects 508 may be implemented using any one of a wide variety of configurations of the reference layup head 404 and the production layup head 562. Method 200 is similar in scope to method 100, and any one or more of the steps, functionalities, and apparatuses associated with method 100 are applicable to any other methods disclosed herein, including method 200 and below-described method 300. Likewise, any one or more of the steps, functionalities, and apparatuses associated with method 200 are applicable to any other methods disclosed herein, including method 100 and method 300.

In the example of FIG. 6, the reference layup head 404 collects the tows 456, arrays them side-by-side into a course 450, and applies the course 450 onto the substrate 476 while the reference layup head 404 is moved relative to the substrate 476 along a pre-programmed path. The reference layup head 404 includes various components for guiding, cutting, and clamping the tows 456 prior to application onto the substrate 476. As shown in FIGS. 3, 4 and 6 and mentioned above, the reference layup head 404 includes a compaction device 410, at least one heating device 414 located forward of the compaction device 410, and at least one infrared camera 406 located aft of the compaction device 410, as mentioned above.

The method 200 includes applying the tows 456 of composite material 452 onto the substrate 476 which, as mentioned above, may be the tool surface 480 of a reference layup tool 478, or the substrate 476 may be courses 450 of composite material 452 previously applied by the reference layup head 404. In the example of FIG. 3, the reference layup tool 478 has a flat tool surface 480, which may simplify manufacturing of the reference layup tool 478, and may also simplify the set up (e.g., pre-programming) and operation of the reference layup head 404. In addition, providing the reference layup tool 478 with a flat tool surface 480 may simplify the process of laying up the reference layup 470, and capturing reference images 500. Preferably, each defect type 516 that can potentially occur in a production layup 560 is produced at multiple locations in the reference layup 470 by the reference layup head 404.

The composite material 452 applied by the reference layup head 404 is comprised of unidirectional reinforcement fibers pre-impregnated with resin (i.e., prepreg). The reinforcing fibers are formed of any one of a variety of materials such as plastic, glass, ceramic, carbon, metal, or any combination thereof. The resin is a thermosetting resin or a thermoplastic resin, and is formed of any one of a variety of organic or inorganic materials. In courses 450 comprised of side-by-side tows 456 (FIG. 6) of composite material 452, each tow has a width 0.25-0.50 inch or more. In contrast, a course 450 comprised of single-width tape 454 (FIG. 5) of composite material 452 may have a width of several inches (e.g., 2 inches) up to a width of 12 inches or more. A course 450 made up of side-by-side tows 456 may be better suited for layup on curved tool surfaces 480 than a single-width tape 454. In contrast, single-width tape 454 may be better suited for layup on generally flat or planar tool surfaces 480, due in part to the ability of a single-width tape 454 to cover a larger surface area in a shorter period of time, and in a more cost-effective manner than a plurality of tows 456.

Referring still to FIG. 2 with additional reference to FIG. 6, during application of a course 450 of composite material 452 onto the substrate 476, the method 200 includes applying, using the heating device 414, heat 416 to the substrate 476 at a location immediately forward of the compaction device 410, as shown in FIG. 4. Applying heat 416 to the substrate 476 reduces the viscosity of the resin in previously applied composite material 452, thereby increasing the level of tack or adhesion between the course 450 and the substrate 476. Additionally, the application of heat 416 to the substrate 476 reduces resin viscosity in the course 450, due to conduction of heat 416 from the substrate 476 into the course 450, as shown in FIG. 4. The heating device 414 may be provided as an infrared heater, a laser heater, a xenon flash lamp, or any one of a variety of alternative heating device 414 configurations.

Step 202 of the method 200 comprises capturing, using one or more infrared cameras 406 of the reference layup head 404, a series of reference images 500 (i.e., infrared images) of the course 450 of the reference layup 470 applied to the substrate 476 as side-by-side tows 456. Preferably the tows 456 of a course 450 are applied to the substrate 476 in non-overlapping and non-gapped relation with each other, as shown in FIG. 6. As reference images 500 are captured, the method 200 may further include assigning, to each reference image 500, a build identification number of the reference layup 470, an image capture time of each reference image 500, and an image capture location on the reference layup 470. The image capture location may be provided in terms of coordinates (e.g., x, y, z) of the reference layup head 404 relative to the reference layup tool 478 or other feature in the manufacturing cell or laboratory where the reference layup 470 is being laid up.

In FIGS. 5-6, the infrared camera 406 is mounted and oriented such that the field of view 408 of the infrared camera 406 extends across the entire width of the course 450, and may additionally capture a small section of the substrate 476 on each of opposite sides of the course 450. The infrared camera 406 may be configured to capture a reference image 500 periodically, such as every tenth of a second, or after every few inches of travel of the reference layup head 404, or in any other manner that ensure that the entire length of the course 450 is captured collectively by the reference images 500. Although the figures show a single infrared camera 406 mounted to the reference layup head 404, in other examples not shown, a reference layup head 404 may include two or more infrared cameras 406, each mounted in a manner to capture different regions of the course 450 as the course 450 is dispensed from the reference layup head 404.

Step 202 of capturing the reference images 500 comprises capturing, using the infrared camera 406, the reference images 500 at a location on the course 450 immediately aft of the compaction device 410, as shown in FIG. 6. As mentioned above, the compaction device 410 is configured to compact or press the course 450 against the substrate 476. In the example shown, the compaction device 410 is a compaction roller 412. The compaction roller 412 is preferably formed of an elastomeric or compliant material to allow the roller to at least partially conform to curvature in the substrate 476 when compacting the course 450.

The process of laying up the reference layup 470 while capturing reference images 500 may continue until all composite plies 474 have been laid up. Alternatively, the process of laying up the reference layup 470 and capturing reference images 500 may continue until at least one of each defect type 516 is captured in at least one reference image 500. Preferably, each defect type 516 is captured in a plurality of reference images 500. Having a plurality of reference images 500 for each defect type 516 may improve the robustness of the model 602 in accurately identifying the same defect type 516 in a production layup 560.

In preparation for training the neural network 600, the method 200 includes deleting references images 500 that are off-part images (not shown), obstructed-view images (not shown), and/or non-layup-head-movement images (not shown). Off-part images may be described as reference images 500 in which the course 450 is not being dispensed onto the substrate 476. Off-part images may occur after the end of one course 450 has been laid down on the substrate 476, and the reference layup head 404 is repositioning itself in preparation for starting to lay down another course 450 on the substrate 476. Obstructed-view images may be described as reference images 500 for which a portion of the course 450 is obstructed (e.g., by hardware) from the normal field of view 408 (e.g., FIGS. 5-6) of the infrared camera 406. Non-layup-head-movement images may be described as reference images 500 taken when the reference layup head 404 is stationary.

Figure 7:
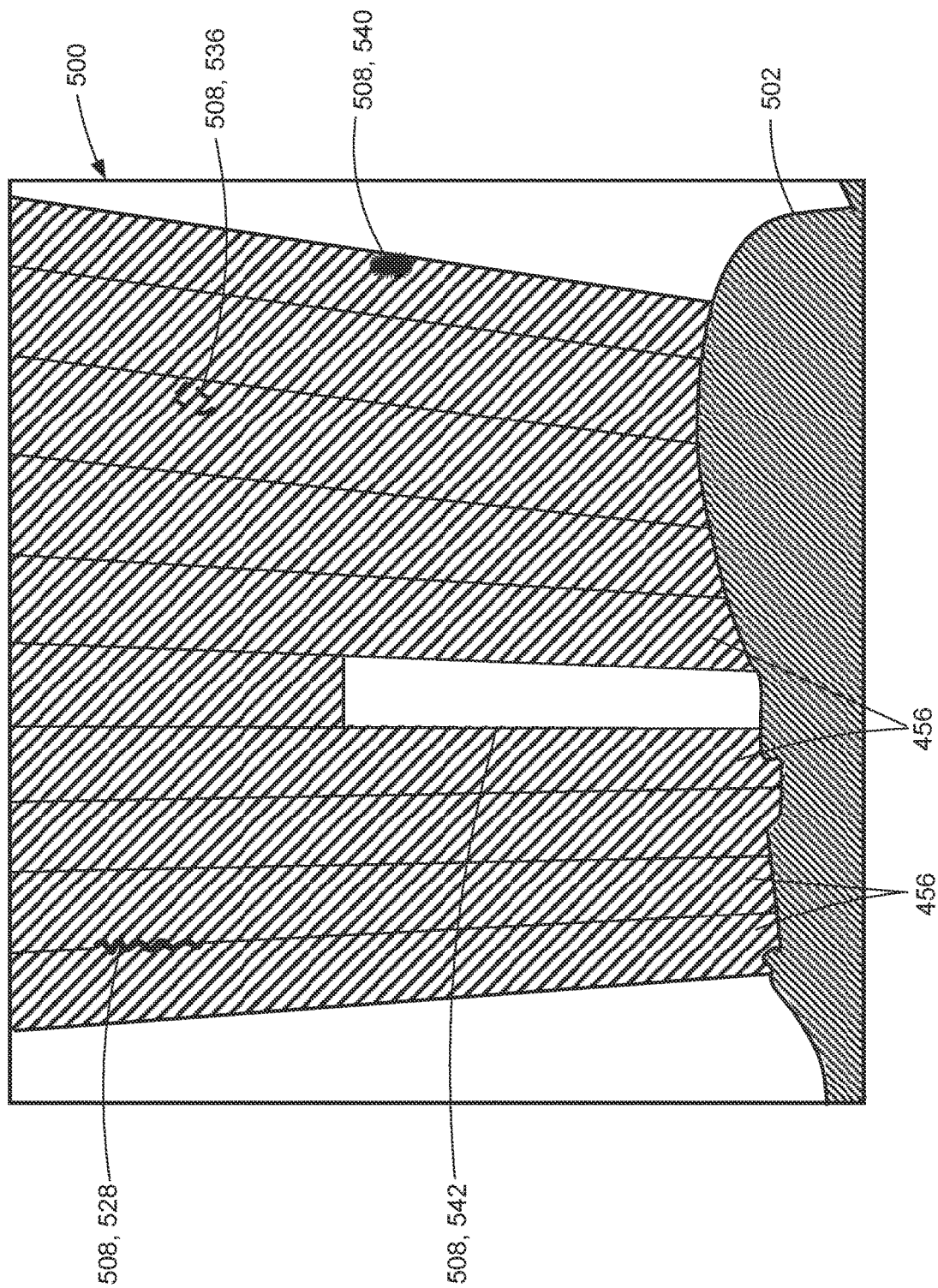
FIG. 7 shows an example of a reference image captured by the infrared camera of the reference layup head, and illustrating puckers, a fuzzball, foreign object debris, and a dropped tow.
Figure 10:
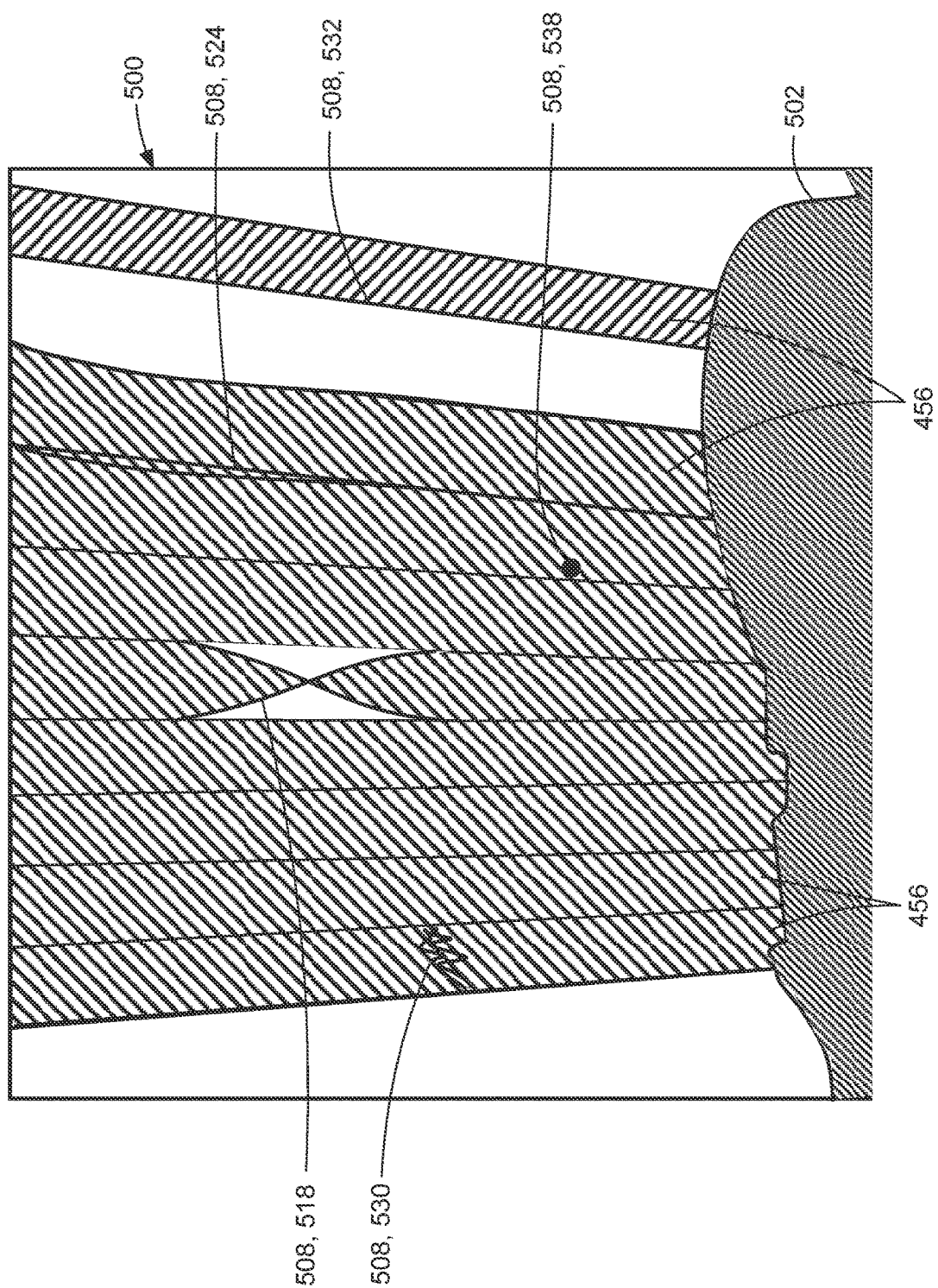
FIG. 10 shows an example of a reference image captured by the infrared camera of the reference layup head, and illustrating wrinkles, a twisted tow, a resin ball, and a missing tow.
Figure 13:
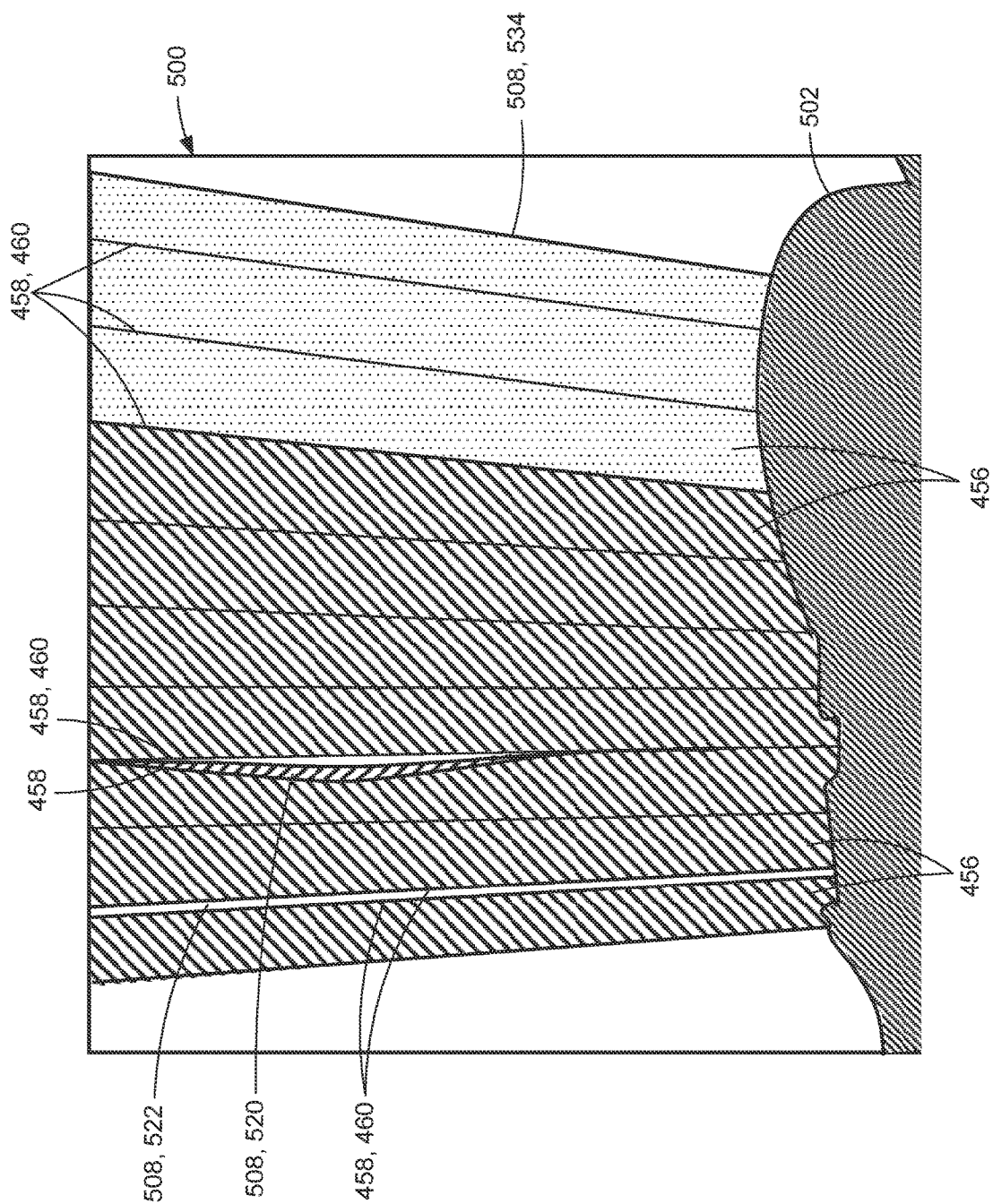
FIG. 13 shows an example of a reference image captured by the infrared camera of the reference layup head, and illustrating a gap, a folded tow, and low-quality tack.

In further preparation of the reference images 500 for training the neural network 600, the method 200 includes preprocessing the reference images 500 (e.g., FIGS. 7, 10, and 13). For example, the method may include cropping each reference image 500 to remove some or all of non-layup features 502 from the reference image 500. Non-layup features 502 may include extraneous background features such as components of the reference layup head 404 or components of the reference layup tool 478. The reference images 500 may also be scaled in preparation for training the neural network 600. Each reference image 500 (e.g., thermographic image) may be a grayscale image comprised of pixels ranging from black to white and various levels of gray, representative of temperature differences of the course 450, the substrate 476, and the defects 508. The pixel intensity values may be integers ranging from 0 to 255. The method may include normalizing each reference image 500 by centering the range of pixel intensity values at a mean pixel value, and rescaling the range of pixel intensity values by the standard deviation.

Figure 8:
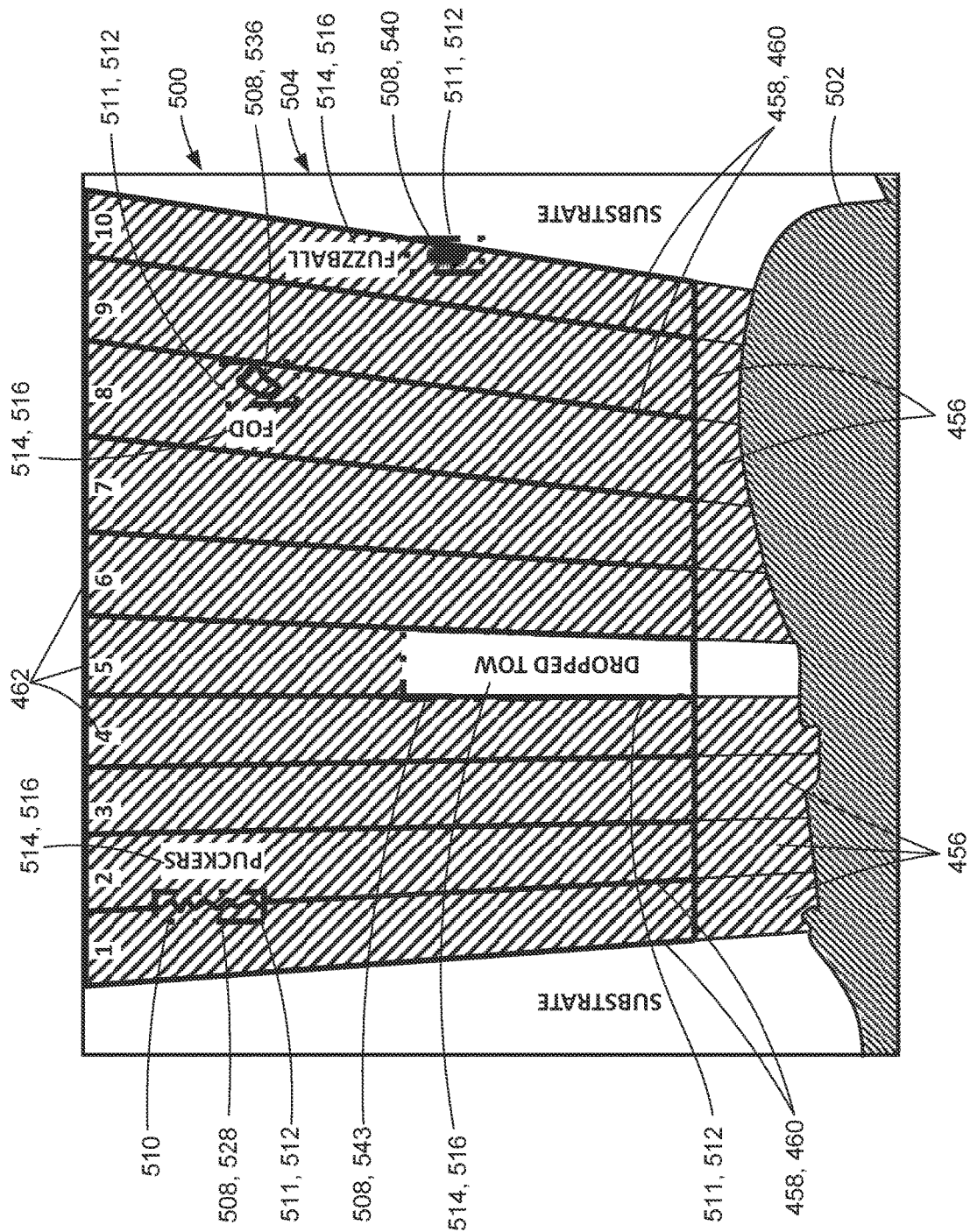
FIG. 8 shows an example of a reference defect mask (i.e., pixel mask) superimposed on the reference image of FIG. 7, and indicating the tow boundaries of each tow, and indicating the defect location and defect type of each defect in FIG. 7.
Figure 11:
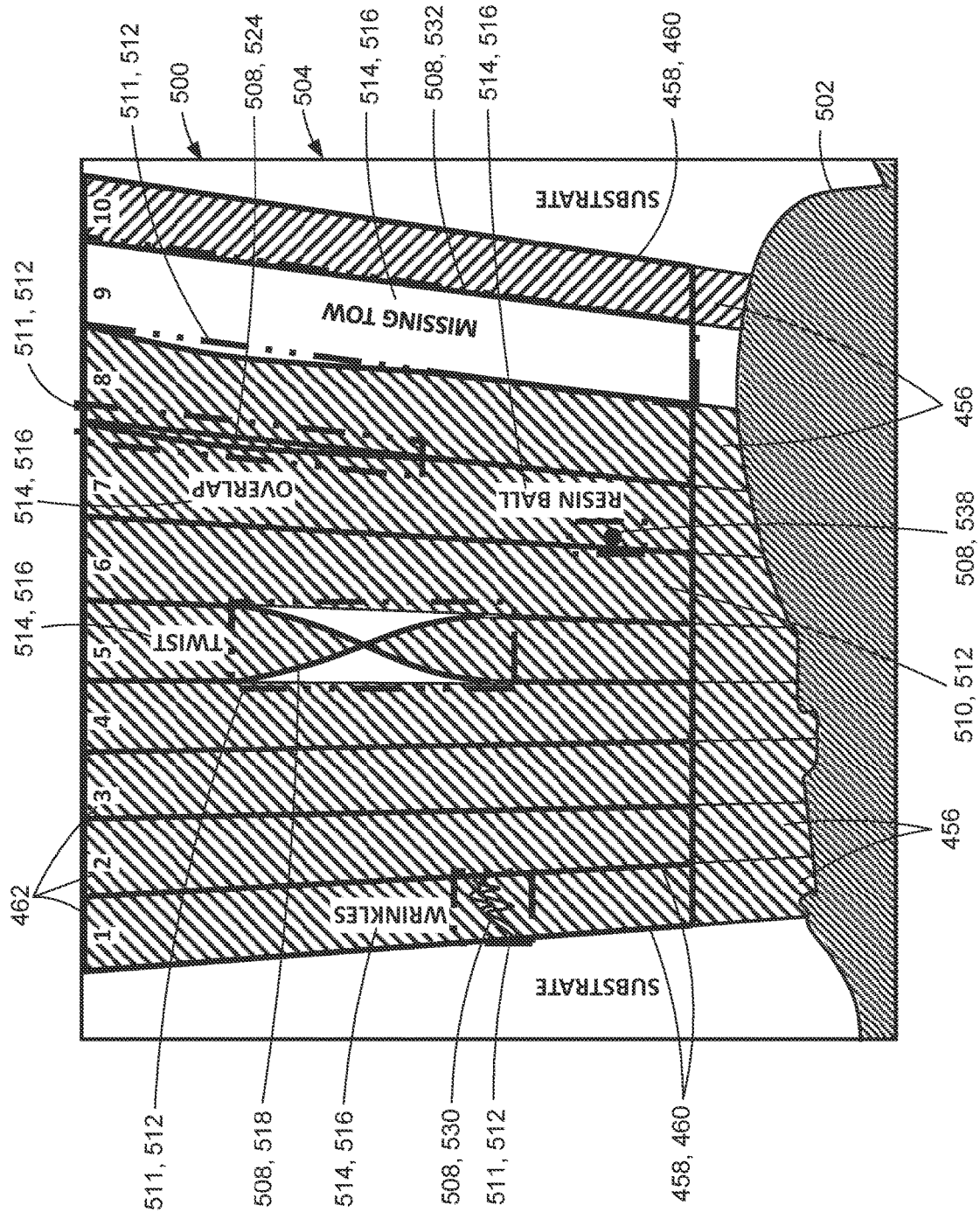
FIG. 11 shows the reference defect mask superimposed on the reference image, and indicating the tow boundaries, the defect location, and the defect type of each defect in FIG. 10.
Figure 14:
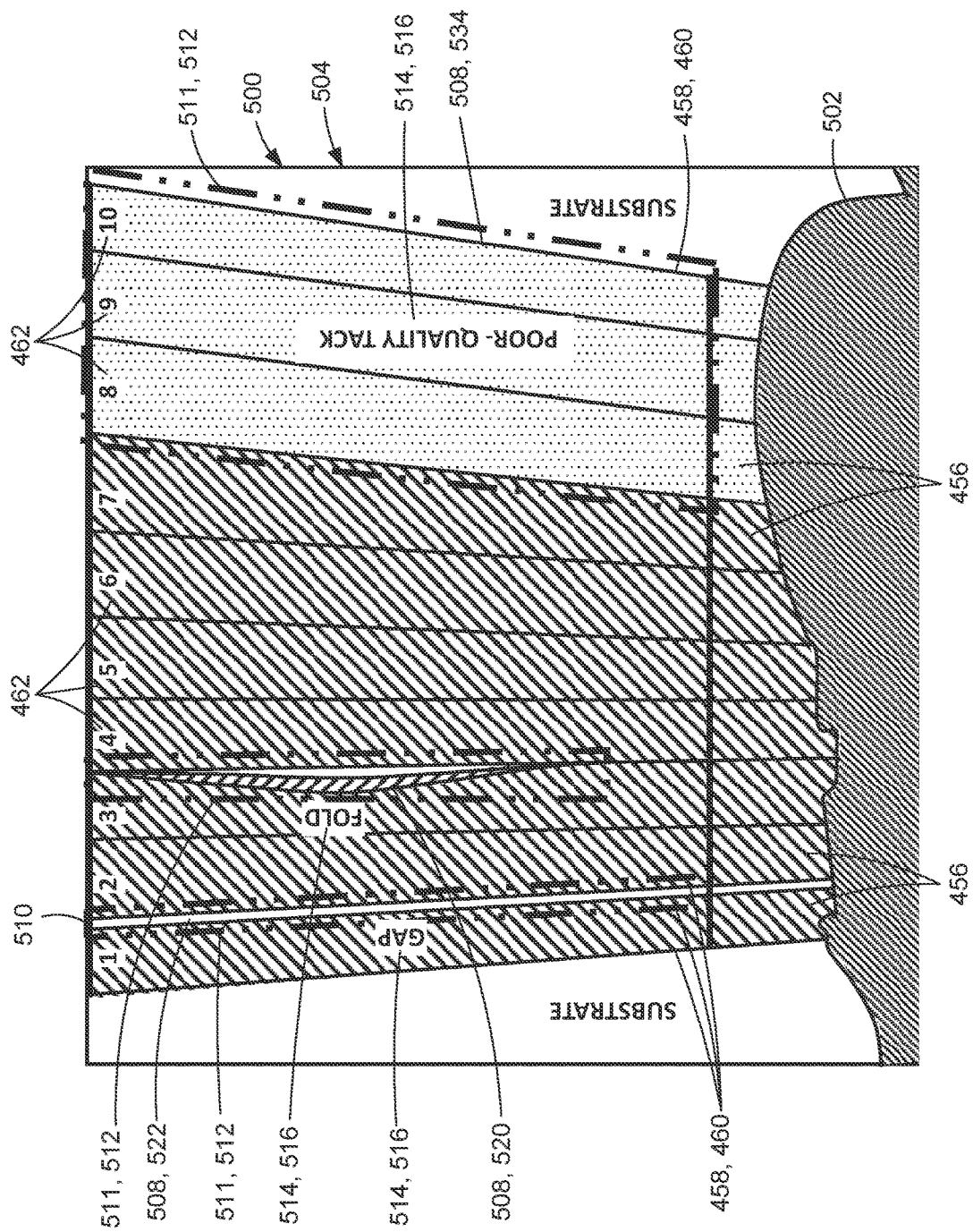
FIG. 14 shows the reference defect mask superimposed on the reference image, and indicating the tow boundaries, the defect location, and the defect type of each defect in FIG. 13.

In FIG. 2, step 204 of the method 200 includes manually reviewing the reference images 500 for defects 508, and annotating each reference image 500 that contains one or more defects 508. Annotating each reference image 500 comprises generating a reference defect mask 504 (i.e., labeled pixel mask) indicating the defect location 510 and defect type 516 of each defect 508 in the reference image 500, similar to the reference images 500 and reference defect masks 504 shown in FIGS. 8, 11, and 14. The defect location 510 of each defect 508 may be indicated on the reference defect mask 504 by forming a bounding box 512 around each defect 508 in the reference imaged, as described above for method 100. The reference defect masks 504 of FIGS. 8, 11, and 14 show a defect boundary 511 encircling each region of the reference layup 470 containing a defect 508. The defect boundary 511 may have an irregular shape that follows the shape of the defect 508. In the example shown, the defect boundary 511 is a bounding box 512 having straight sides. In an alternative example not shown, the defect location 510 of each defect 508 may be indicated by color-coding the pixels that represent the defect 508. Regardless of the manner of indicating defect locations 510, it should be noted that because certain defects 508 may extend past a single reference image 500, any single defect 508 that is visible in multiple reference images 500 is mapped as a single defect 508. For example, in the case of missing tape or tows 532 that extend past a single reference image 500, the reference defect masks 504 respectively associated with the reference images 500 will indicate on the defect map 632 that the missing tape or tows 532 is a single defect 508.

In step 204, indicating the defect type 516 of each defect 508 comprises indicating each defect 508 as one of the following defect types 516: a twist 518, a fold 520, a gap 522, an overlap 524, bridging (not shown), puckers 528, wrinkles 530, missing tape or tows 532, low-quality tack 534, a resin ball 538, a fuzz ball 540, or foreign object debris 536. The technician performing image annotation may apply the appropriate defect label 514 next to the bounding box 512 surrounding each defect 508.

FIG. 7 shows an example of a reference image 500 containing defects 508 including puckers 528, a fuzz ball 540, foreign object debris 536, and a dropped tow 542. FIG. 10 shows an example of a reference image 500 containing defects 508 including wrinkles 530, a twist 518, a resin ball 538, and a missing tow 532. FIG. 13 shows an example of a reference image 500 containing defects 508 including a gap 522, a fold 520, and low-quality tack 534. Although not shown, any one or more of the above identified defect types 516 may occur in a single-width tape 454 (FIG. 5) when laid up by a layup head (e.g., an automated fiber placement head).

A twist 518 (FIG. 10) may be described as a location along the length of a tow or tape 454 where the composite material 452 has spiral wound (e.g., 180° around itself as it is laid down on the substrate 476 by a layup head. A fold 520 (FIG. 13) may be described as a location along the length of a tape 454 or tow 456 where the composite material 452 has doubled up or folded over on itself when laid down by a layup head. A dropped tape or tow 542 (FIG. 7) may be described as a tape 454 or tow 456 initially applied to the substrate 476, but is unintentionally cut by the layup head, or is a result of depletion of a spool of tape 454 or tow 456 on the layup head. A gap 522 (FIG. 13) may be described as a condition in which the side edges of adjacent tapes 454 or the side edges of adjacent tows 456 in the same composite ply 474 are spaced apart from each other over a section of their length. An overlap 524 (FIG. 10) is a condition in which adjacent tapes 454 or adjacent tows 456 in the same composite ply 474 are on top of each other over a section of their length.

Bridging is a condition in which a tape 454 or a tow 456 spans across a valley (i.e., a concave curvature) in the surface of the substrate 476, and may occur at an inside corner in the tool surface 480 of the layup tool. Puckers 528 (FIG. 7) may be described as an area of composite material 452 that is locally raised along the side edges of tape 454 or a tow 456, and may occur in tape 454 or tows 456 that are steered in an in-plane direction. Wrinkles 530 (FIG. 10) are similar to puckers 528, and may be described as out-of-plane distortions in the interior regions between the side edges of a tape 454 or tow 456. Low-quality tack 534 (FIG. 13) may be described as a level of adhesion between the course 450 and substrate 476 that is below a threshold value.

Foreign object debris 536 (FIG. 7) may be described as any type of extraneous material that is unintended for incorporation into the composite layup, and may include small pieces of backing paper or film, plastic or metal particles, liquids such as water or oil, or any other type of material. Other examples of foreign object debris 536 include, but are not limited to, resin balls 538 and fuzz balls 540. Resin balls 538 (FIG. 10) may be described as small globules of resin that can accumulate on the components (e.g., tow guides) of a layup head as the tape 454 or tows 456 pass through the layup head, eventually dropping onto the substrate 476, and falling onto the substrate 476. A fuzz ball 540 (FIG. 7) may be described as loose bundles of fiber filaments that are formed along the side edges of tape 454 or tow 456 while passing through the layup head, and can fall from layup head onto the substrate 476, or onto the course 450 being applied to the substrate 476.

A technician reviewing the reference images 500 can detect and identify the defect type 516 of the above-noted defects 508 based on the size and shape of contiguous groups of pixels, which may have different pixel intensity values than surrounding pixels. For example, a resin ball 538 may be represented by a group of black pixels having a rounded shape of a certain size (e.g., a width of 3-7 mm), and which may be surrounded by pixels of a lighter shape, representing the composite material 452 underlying the resin ball 538.

For reference images 500 in which the course 450 is comprised of side-by-side tows 456 (FIG. 6), the step of generating the defect masks may further include indicating, on the reference defect mask 504, the tow boundaries 458 of each tow in the course 450, and labeling each tow 456 with a unique tow identification number 462, as shown in the reference defect masks 504 of FIGS. 9, 12 and 15. A technician reviewing the reference images 500 may detect the tow boundaries 458 of the tows 456 based on contrasts in pixel intensity, similar to the manner in which defects 508 are detected.

FIG. 8 shows an example of a reference defect mask 504 (i.e., a pixel mask) generated for the reference image 500 of FIG. 7. FIG. 10 shows an example of a reference defect mask 504 generated for the reference image 500 of FIG. 9. FIG. 13 shows an example of a reference defect mask 504 generated for the reference image 500 of FIG. 12. Each reference defect mask 504 indicates the tow boundaries 458 or tow side edges 460 of each tow 456 in the course 450, and labels each tow 456 with a unique tow identification number 462.

Visual review of the reference images 500, and generation of the reference defect masks 504, is preferably performed using an image-annotation software program. Examples of image-annotation software programs include, but are not limited to, an image annotating tool referred to as Napari™, and an image-processing tool referred to as Scikit-image™, both of which are in Python programming language. Visual review of the reference images 500 is preferably performed by a domain expert who has experience in recognizing the various defect types 516 that can occur during the laying up of composites using automated fiber placement equipment (e.g., layup heads). After generating a reference defect mask 504 for a reference image 500 containing a defect 508, the method includes storing each reference image 500 and corresponding reference defect mask 504 in an image/mask database 506 (e.g., FIG. 17).

Figure 16:
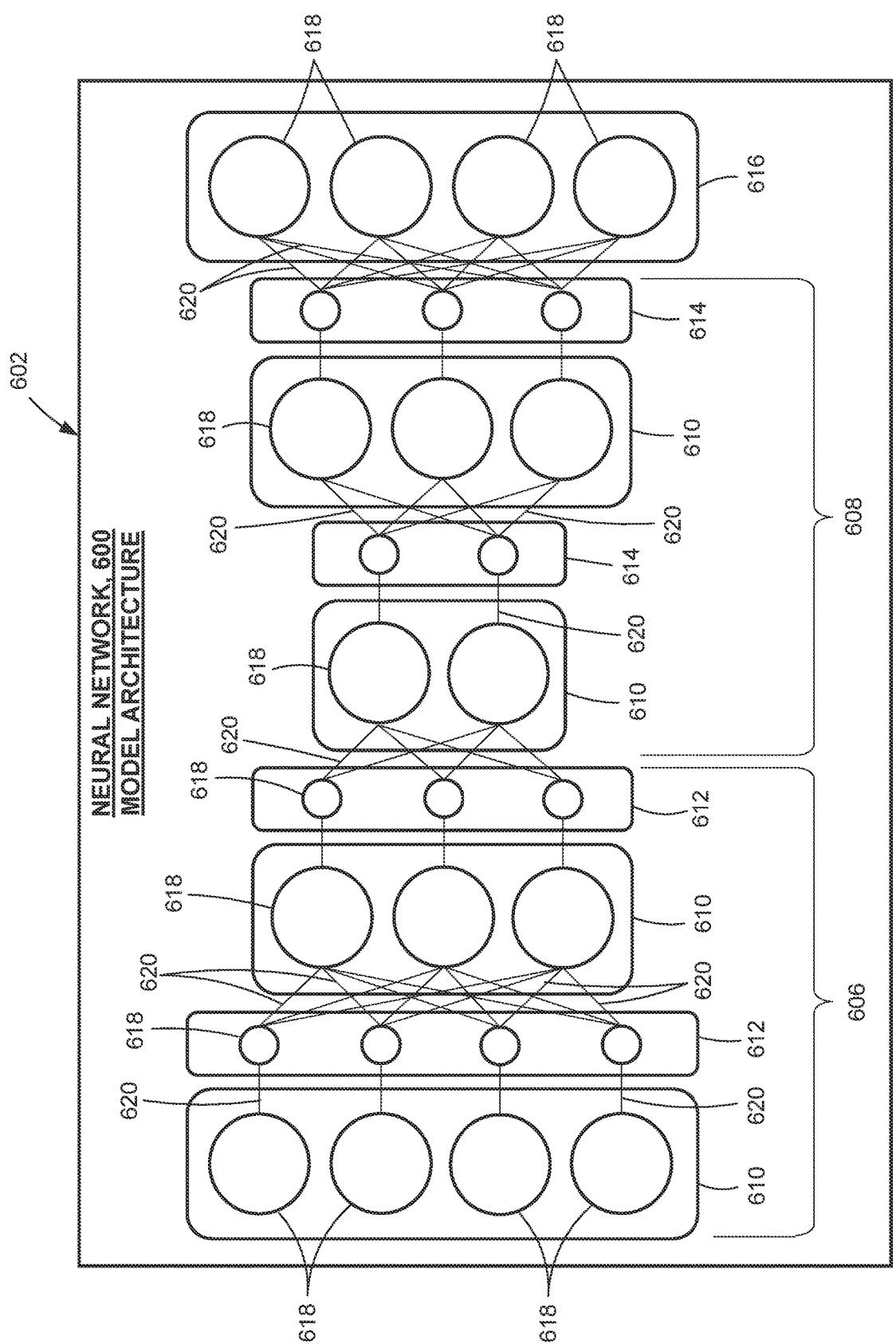
FIG. 16 is a schematic diagram of the model architecture of an artificial neural network.
Figure 17:
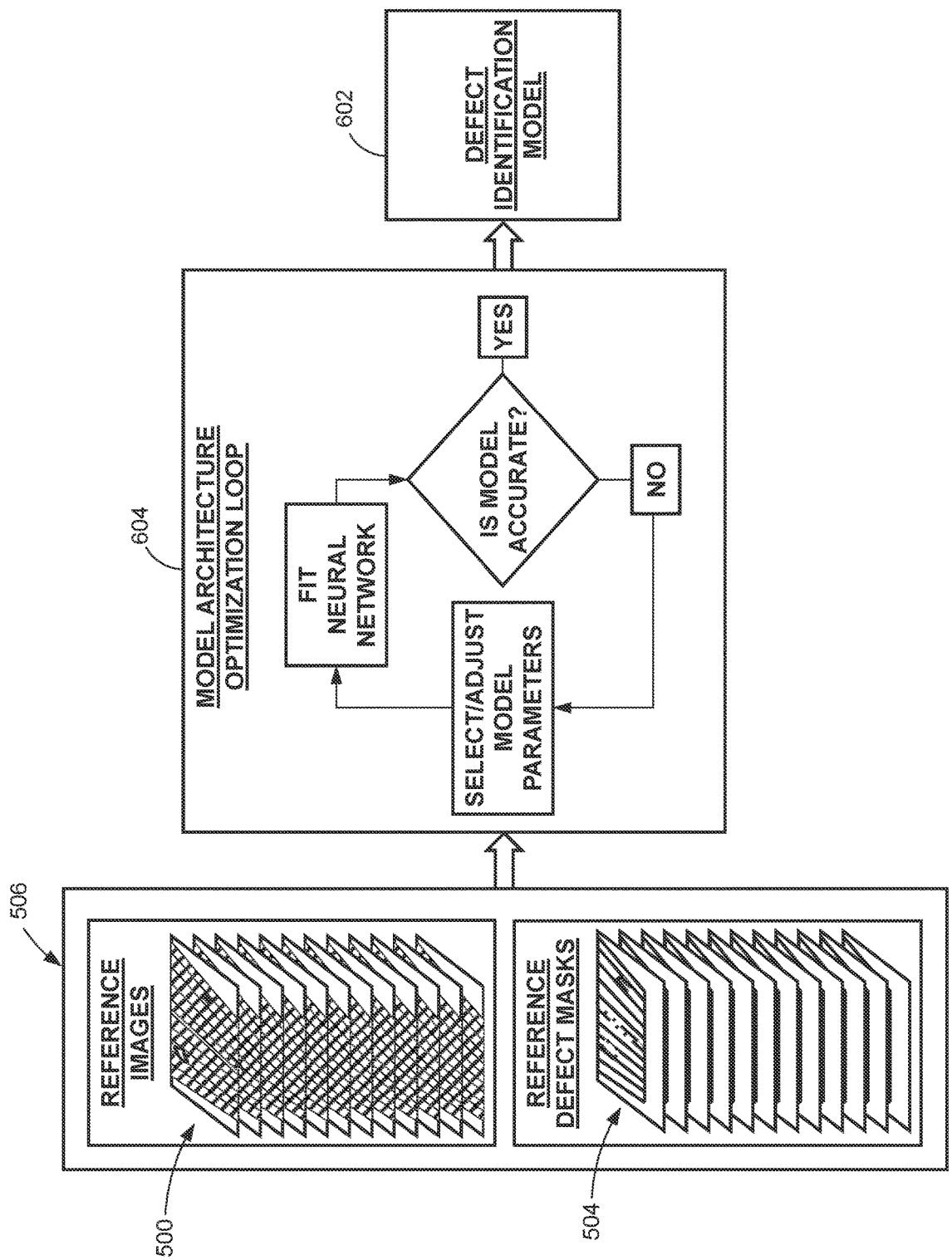
FIG. 17 is a schematic diagram of a model architecture optimization loop.

Referring to FIGS. 16-17, step 206 of the method 200 comprises training, using the reference images 500 and corresponding reference defect masks 504, an artificial neural network 600 to perform segmentation in a manner creating a machine learning defect identification model 602 (i.e., a model) that, given a production image 566 (e.g., an infrared image) as input, automatically outputs a production defect mask 568 indicating the defect location 510 and the defect type 516 of each defect 508 detected by the model 602. For reference images 500 in which the course 450 is comprised of side-by-side tows 456 (FIG. 6), the production defect masks 568 also contain the tow boundaries 458 and the tow identification number 462 of each tow in the course 450, as described in greater detail below.

The step 206 of training the neural network 600 comprises training the neural network 600 to perform either semantic image segmentation or instance segmentation. In semantic image segmentation, the model 602 determines the class of each defect 508 (i.e., the defect type), but does not distinguish defects 508 in the same image as separate objects. For example, if a production image 566 contains 2 defects 508 of the same defect type 516, the model 602 may not distinguish the defects 508 as separate objects. In contrast, in instance segmentation, each instance of a defect 508 is identified as a separate object.

FIG. 16 is a schematic diagram of an example of a model architecture of an artificial neural network 600. The neural network 600 is preferably a convolutional neural network 600. The model 602 may have an input layer (not shown) and an output layer 616. In addition, the model 602 includes an encoder portion 606 and a decoder portion 608. The encoder portion 606 includes a quantity of convolution layers 610 and a quantity of down-sampling layers 612. The decoder portion 608 includes a quantity of convolution layers 610 and a quantity of up-sampling layers 614. Examples architectures that may be used as the encoder portion of the model 602 include, but are not limited to, EfficientNet, Inception, and MobileNet. As shown in FIG. 16, the architecture of the encoder portion is mirrored to form the decoder portion 608.

In FIG. 16, each layer is made up of neurons 618, which may be described as core processing units of the neural network 600. The neurons 618 in each layer are interconnected, via channels 620, to the neurons 618 in adjacent layers. Each channel has an initial weight (i.e., a numerical value). The input layer receives the input, which are the reference images 500 (see FIG. 17). The output layer 616 predicts the output of the neural network 600, which are the defect types 516 (FIGS. 9, 12, and 15) indicated in the reference defect masks 504 (FIG. 17).

In the encoder portion 606, the convolution layers 610 summarize features in the reference images 500, and the down-sampling layers 612 reduce the dimensions of the features. In the decoder portion 608, the up-sampling layers 614 increase the dimensions of the features, and group pixels into defect masks (e.g., reference defect masks 504 or production defect masks 568). The neural network 600 includes activation functions that apply additional transformations to the output of the neurons 618. Examples of activation functions that may be implemented in the neural network 600 include, but are not limited to, known mathematical functions, such as a sigmoid function, a softmax function, a tanh function, and a Rectified Linear Unit (ReLU).

The convolution layers 610 in the encoder portion 606 and the decoder portion 608 work together via forward propagation (e.g., from left to right in FIG. 16) to predict or infer the defect types 516 in the reference images 500. For a given reference image 500, the output layer 616 outputs the defect type 516 and defect location 510 predicted in the reference image 500. The defect type 516 and defect location 510 in the output layer 616 (i.e., the predicted output) is compared to the defect type 516 and defect location 510 indicated in the corresponding reference defect mask 504 (i.e., the actual output) and, if the prediction is in error, the magnitude of the error is transferred back through the neural network 600 via back propagation (e.g., from right to left in FIG. 16), causing the weights to be automatically adjusted. The cycle of forward propagation and back propagation continues iteratively until the model 602 correctly identifies the defect type 516 in the reference defect mask 504 with sufficient accuracy (e.g., 95 percent accuracy).

FIG. 17 is a diagram of a model architecture optimization loop 604 for optimizing the configuration of the model 602. Optimization of the model 602 includes selecting and adjusting model parameters in the model architecture optimization loop 604. The model parameters are initially selected during operation of the model. The model parameters are adjusted during optimization. For example, the quantity of convolution layers 610 and down-sampling layers 612 in the encoder portion 606 of the model 602 may be adjusted. In addition, the quantity of convolution layers 610 and up-sampling layers 614 in the decoder portion 608 of the model 602 may be adjusted. Other model parameters that may be adjusted include the size of the reference images 500 (i.e., quantity of pixels) that are input into the neural network 600, and/or selection of different types of activation functions in the neural network 600. After adjusting one or more model parameters, the method includes fitting the neural network 600 to the defect types 516 in the reference images 500. The steps of adjusting the model parameters, and fitting the neural network 600 to the defect types 516, are repeated until the model 602 correctly identifies the defect types 516 present in each reference defect mask 504 with sufficient accuracy (e.g., 95 percent accuracy).

Referring to FIG. 18, shown is an example of a production layup 560 during fabrication. The method 200 includes applying, via a production layup head 562, a course 450 of a composite ply 474 of the production layup 560 onto a substrate 476. As described above, the production layup head 562 may be the same as, or different than, the above-described reference layup head 404. Although shown supported by a robotic device 400, the production layup head 562 may be supported by an overhead gantry (not shown), or any one of a variety of other mechanisms for moving the production layup head 562 relative to the substrate 476. The production layup head 562 includes an infrared camera 406 mounted in a manner similar to the above-described arrangement for the reference layup head 404 in FIGS. 4-6.

In FIG. 18, the substrate 476 is a production layup tool 564. Alternatively, the substrate 476 may be a composite ply 474 previously laid up over the production layup tool 564 by the production layup head 562. In the example shown, each course 450 is comprised of tows 456 of composite material 452 in side-by-side relation to each other, similar to the arrangement shown in FIG. 6.

Step 208 of the method 200 includes capturing, using an infrared camera 406 of the production layup head 562, a series of production images 566 of the course 450 of the production layup 560 being applied by the production layup head 562. The series of production images 566 are captured in real time while the layup head applies the composite material 452 onto the substrate 476. Each production image 566 may be labeled with a build identification number of the production layup 560. In addition, each production image 566 may be labeled with an image capture time and an image capture location of the production layup head 562 relative to a reference location, such as the part origin 634 shown in FIG. 18.

Referring to FIG. 20, step 210 of the method 200 includes applying the model 602 to the production images 566, and automatically generating (i.e., without human intervention), for each production image 566 containing a defect 508, a production defect mask 568 indicating the defect type 516, the defect location 510 on the course 450, and the tow identification number of one or more of the tows 456 containing the defect 508. The model 602 may be applied to each production image 566 immediately after the production image 566 is generated. Alternatively, the model 602 may be applied to a series of production images 566 after laying up a course 450. In a still further example, the model 602 may be applied to the production images 566 after the laying up an entire composite ply 474.

FIG. 19 illustrates a computer 640 showing a digital representation 630 of the course 450 most recently applied to the production layup tool 564 by the production layup head 562. The digital representation 630 of the course 450 may be extracted from a computer-aided-design (CAD) model of the composite layup. FIG. 20 shows production images 566 being submitted to the model 602 for generating production defect masks 568. In response to receiving the production images 566 as input, the model 602 outputs a production defect mask 568 for each production image 566 that contains at least one defect 508 (FIGS. 9, 12, and 15). As mentioned above, each production defect mask 568 indicates the defect location 510 of each defect 508 in the production image 566, such as by placing a bounding box 512 around each defect 508. In addition, each production defect mask 568 identifies, via a defect label 514, the defect type 516 of each defect 508.

Referring to FIGS. 21-24, shown is the display screen 642 of a computer 640. Upon generating one or more production defect masks 568, the method 200 comprises spatially aligning each production defect mask 568 with a digital representation 630 of a region of the course 450 captured in the corresponding production image 566, and resulting in a defect map 632 as shown in FIG. 22. The process of spatially aligning each production defect mask 568 with the digital representation 630 of a course 450 of a production layup 560 comprises inferring the on-part location 636 of each defect 508 associated with the course 450, based on the pixel-wise location of each defect 508 indicated in the production defect masks 568. In addition, inferring the on-part location 636 of each defect 508 may be based on the tow identification number of the tows 456 containing the defect 508, and the location of the production layup head 562 relative to the production layup 560 at the image capture time of the production image 566 containing the defect 508. The location of the production layup head 562 may be obtained via the build logs, the course geometry, and the machine code (i.e., the programming instructions defining the movement paths of the production layup head 562). The location and orientation of the infrared camera 406 relative to the production layup head 562 may also be used to infer the on-part location 636 of each defect 508.

Figure 24:
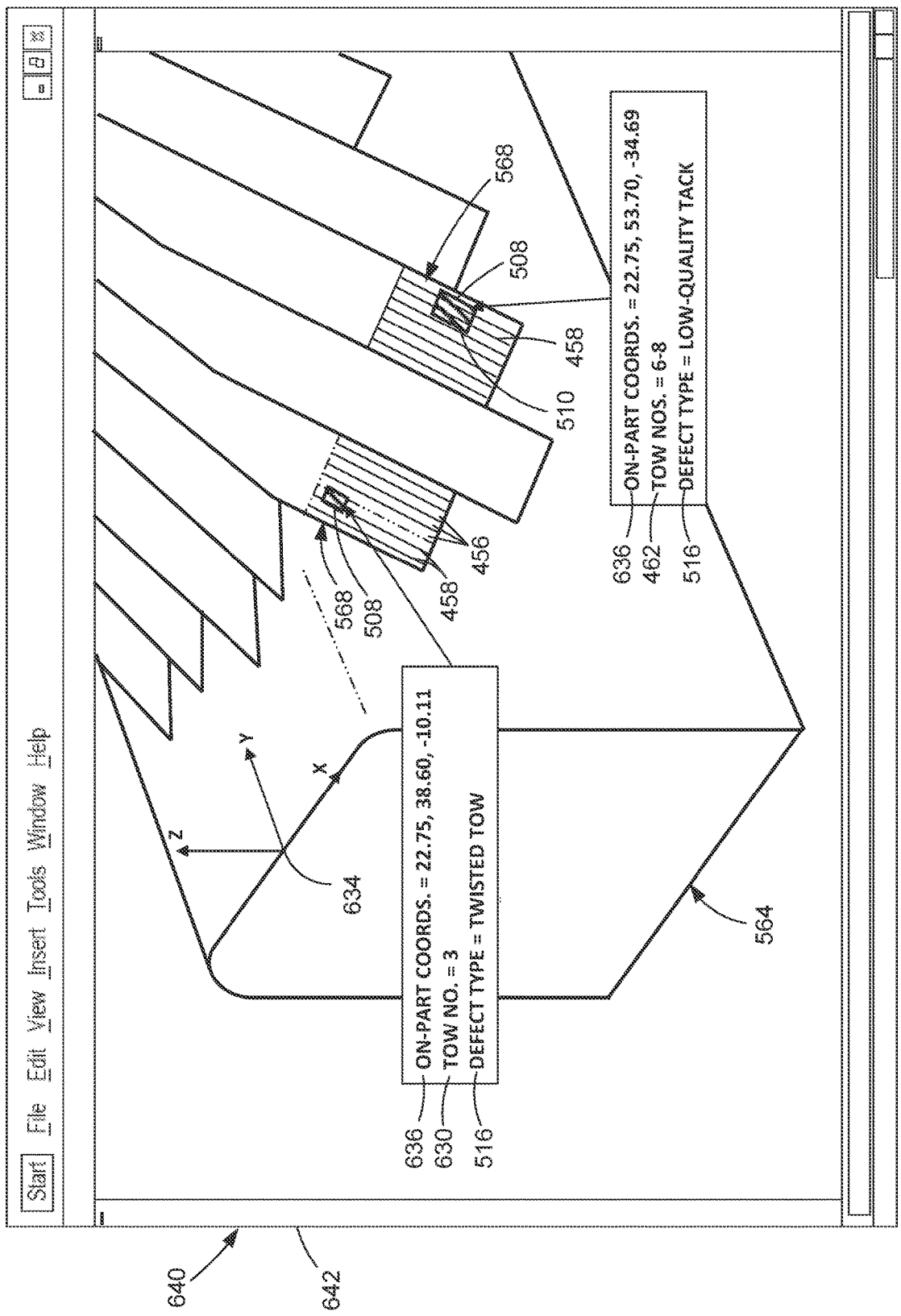
FIG. 24 shows a magnified view of a portion of the defect map of FIG. 23, illustrating the on-part coordinates and the defect type of several defects in the composite ply.

In some examples, a defect map 632 may be generated after laying up all of the courses 450 of a composite ply 474. FIGS. 23-24 show an example of a defect map 632 containing a digital representation 630 of an entire composite ply 474 laid up on the production layup tool 564, and indicating the on-part location 636 (via defect boundaries 511, such as bounding boxes 512) of each defect 508 associated with the composite ply 474. FIG. 24 is a magnified view of a portion of the defect map 632 of FIG. 23, illustrating the on-part coordinates and the defect type 516 of several defects 508.

In the examples of FIGS. 22-24, each defect map 632 comprises a digital representation 630 of the production layup 560, and includes the defect location 510 and defect type 516 of each defect 508 defined in the production defect masks 568. In the defect map 632 of FIG. 24, the on-part location 636 of each defect 508 is defined in terms of x, y, z coordinates relative to the part origin 634. At each on-part location 636, the defect map 632 shows the tow boundaries 458 of the tows 456, and lists the tow identification number 462 of the tows 456 that contain the defect 508, and additionally lists the defect type 516 of the defect 508.

The method 200 may include using the defect map 632 to physically locate, on the production part (i.e., the production layup 560), one or more of the defects 508 indicated on the defect map 632. For example, following the laying up of each course 450 of a composite ply 474 of a production layup 560, quality assurance personnel may physically locate each defect 508 (if any) defined on a defect map 632 automatically generated for the course 450. The quality assurance personnel may physically examine one or more of the defects 508 to determine whether the defects 508 are acceptable or unacceptable. If unacceptable, a determination may be made as to whether to repair the defect 508, and/or adjust one or more layup control processes.

The type of repair for the defect 508 may be dictated by a variety of factors including the defect type 516, the defect location 510 relative to the course 450 geometry and/or relative to other defects 508 in the composite ply 474, and other factors. The method 200 may include repairing one or more of the defects 508 prior to applying subsequent courses 450 of the production layup 560. For example, the method 200 may include removing and replacing a lengthwise section of a course 450, or removing and replacing the entire length of one or more tows 456 of a course 450.

As mentioned above, the method 200 may also include adjusting one or more layup control processes associated with laying up the production layup 560. The layup control processes are adjusted in a manner mitigating subsequent formation of defects 508 of the same defect type 516 as the defect 508 indicated on the defect map 632. For example, the method 200 may include adjusting the travel speed of the production layup head 562 when laying up subsequent courses 450. In this regard, the production layup head 562 may be adjusted to move at different travel speeds at different lengthwise sections of the course 450. In one example, the travel speed of the production layup head 562 may be reduced along lengthwise sections of the production layup 560 that have a large degree of surface curvature, and the travel speed may be increased along sections of the production layup 560 that are generally flat or planar.

For defects 508 identified as low-quality tack 534, the method 200 may include adjusting the heat 416 output (FIG. 4) of the heating device 414 (FIG. 4) for increasing the temperature of the substrate 476 prior to compaction by the compaction roller 412 (FIG. 4), to thereby increase the tack (i.e., the adhesive force) between the course 450 and the substrate 476. The amount of compaction pressure applied by the compaction roller 412 onto the course 450 against the substrate 476 may also be adjusted to improve tack. Other layup control processes that may be adjusted include the ambient air temperature and/or the humidity level of the manufacturing environment, the out-time of the composite material 452 prior to application by the layup head, and the magnitude of tension force in courses 450 during application by the production layup head 562 onto the substrate 476.

In some examples, the method 200 may include determining whether each defect 508 in a course 450 is acceptable or non-acceptable based on the distance between the defect 508 and a nearest adjacent defect 508. If a defect 508 is deemed unacceptable, the method 200 includes repairing the defect 508 and/or adjusting one or more layup process parameters based on the defect type 516. For example, for foreign object debris 536, such as resin balls 538 or fuzz ball 540, that are accessible without removing a course 450, the step of repairing the course 450 includes simply removing the defect 508. For foreign object debris 536 that is inaccessible without removing the course 450, the step of repairing the course 450 comprises removing the course 450 before or after laying up the entire composite ply 474, removing the foreign object debris 536, and re-applying the course 450 either manually, or via the production layup head 562.

For defects 508 such as twists 518, folds 520, gaps 522, overlaps 524, bridging (not shown), puckers 528, or wrinkles 530 in the course 450, the step of repairing the course 450 comprises removing at least a portion of the tape 454 or tows 456 containing the defect 508, and re-applying the course 450 with increased heat output from the heating device 414 to increase the tack between the course 450 and the substrate 476. For defects 508 such as bridging (not shown), puckers 528, or wrinkles 530 in the course 450, the method 200 may also include decreasing the travel speed of the production layup head 562, at least along the section of the course 450 where the defect 508 occurred. For missing tape or tows 532, the step of repairing the course 450 includes applying tape 454 or tows 456 in the missing location, either manually or by using the production layup head 562.

In some examples, the method 200 may include using the production images 566 to further increase the accuracy of the model 602. For example, in the early stages of manufacturing a new configuration of a production layup 560, the method may include manually reviewing production images 566 for defects 508, and generating, for each production image 566 containing a defect 508, a reference defect mask 504 indicating the defect location 510 and the defect type 516 of each defect 508 in the production image 566. Manual review of the production images 566 and generating the defect masks for production images 566 that contain defects 508 may be performed in the same manner as described above for the reference images 500 in step 204, and may be performed using an image-annotation software program. After manually reviewing the production images 566 and generating defect masks, the method 200 includes inputting the production images 566 and corresponding defect masks into the neural network 600 in a manner similar to above-described step 206, to further train the model 602 for increasing the accuracy of the model 602 in detecting defects 508 in the production images 566 of subsequent courses 450 applied by the production layup head 562.

Figure 25A:
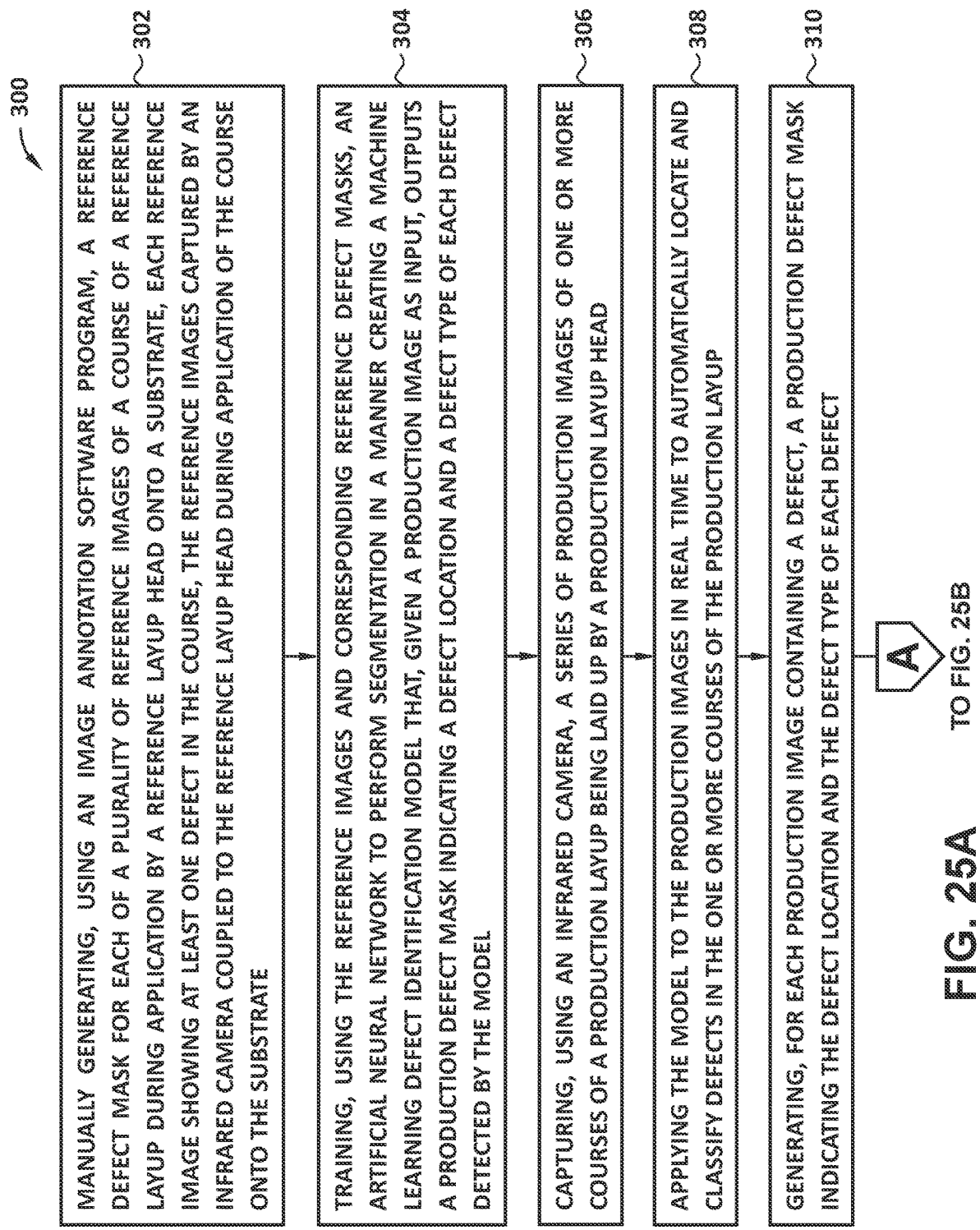
FIG. 25A is an illustration of a flowchart of a portion of a method of in-process mapping of defects in a composite layup.

Referring now to FIGS. 25A-25B, shown is a method 300 of in-process mapping of defects 508 in a composite layup. As mentioned above, any one or more of the above steps, functionalities, and apparatuses associated with method 100 and/or method 200 are applicable to method 300. Method 300 is similar in scope to above-described method 100 and method 200. However, in method 300, the laying up of the reference layup 470 and/or the capturing of the reference images 500 may be performed by a third party. Step 302 of the method 300 includes manually generating, using an image annotation software program, a reference defect mask 504 for each of a plurality of reference images 500 of a course 450 of a reference layup 470 during application by a reference layup head 404 onto a substrate 476. As described above, each reference image 500 is a thermographic image, and may show one or more defects 508 associated with the course 450. Step 304 of the method 300 includes training, using the reference images 500 and corresponding reference defect masks 504, an artificial neural network 600 to perform instance segmentation in a manner creating a machine learning defect identification model 602 that, given a production image 566 as input, outputs a production defect mask 568 indicating the defect location 510 and the defect type 516 of each defect 508 detected by the model 602.

Step 306 of the method 300 includes capturing, using an infrared camera 406 of a production layup head 562, a series of production images 566 of one or more courses 450 of a production layup 560 being laid up by the production layup head 562. As described above, FIG. 18 shows an example of courses 450 of production layup 560 being applied to a production layup tool 564 via a production layup head 562. Step 308 of the method 300 includes applying the model 602 to the production images 566 in real time to automatically locate and classify defects 508 in the courses 450 of the production layup 560. As described above, FIG. 20 shows an example of production images 566 being applied to the model 602 created in step 304.

As shown in FIG. 20, step 310 of the method 300 includes automatically generating, for each production image 566 containing a defect 508, a production defect mask 568 indicating the defect location 510 and the defect type 516 of each defect 508 detected by the model 602, as described above. Step 312 of the method 300 includes spatially aligning each production defect mask 568 with a digital representation 630 of the course 450 as shown in the example of FIG. 21, resulting in a defect map 632 containing the on-part location 636 and the defect type 516 of each defect 508 associated with the course 450, as shown in FIGS. 22-24.

Step 314 of the method 300 includes physically locating, using the defect map 632, one or more of the defects 508 associated with the course 450. As described above, the method includes repairing one or more of the defects 508 prior to applying subsequent courses 450 of the production layup 560, and/or adjusting at least one layup control process in a manner mitigating formation of defects 508 of the same defect type 516 in the current production layup 560 or in future production layups 560. The method 300 further includes step 316 which comprises, repeating steps 306, 308, 310, and 312 for each course 450, until all courses 450 in each composite ply 474 of the production layup 560 have been laid up.

The disclosure includes example embodiments in accordance with the following clauses:

Clause 1. A method of in-process detection of defects 508 in a composite layup, comprising the steps of:

capturing, using an infrared camera 406 of a reference layup head 404, a series of reference images 500 of a course 450 of a reference layup 470 being laid up by the reference layup head 404;

manually reviewing the reference images 500 for defects 508, and generating, for each reference image 500 containing a defect 508, a reference defect mask 504 indicating a defect location 510 and identifying a defect type 516 of each defect 508 in the reference image 500;

training, using the reference images 500 and corresponding reference defect masks 504, an artificial neural network 600 to perform segmentation in a manner creating a machine learning defect identification model 602 that, given a production image 566 as input, outputs a production defect mask 568 indicating the defect location 510 and the defect type 516 of each defect 508 detected by the model 602;

capturing, using an infrared camera 406 of a production layup head 562, a series of production images 566 of at least one course 450 of a production layup 560 being laid up by the production layup head 562; and applying the model 602 to the production images 566, and automatically generating, for each production image 566 containing a defect 508, a production defect mask 568 indicating the defect location 510 and identifying the defect type 516 of each defect 508 detected by the model 602.

Clause 2. The method of claim 1, wherein training the neural network 600 comprises training a convolutional neural network.

Clause 3. The method of Clause 1 or 2, wherein training the convolutional neural network comprises:
selecting or adjusting model parameters in a model architecture optimization loop 604, the model parameters comprising at least one of the following:
the quantity of convolution layers 610 and down-sampling layers 612 in an encoder portion 606 of the model architecture;
the quantity of convolution layers 610 and up-sampling layers 614 in a decoder portion 608 of the model architecture;
the size of the reference images 500 that are input into the neural network 600;
the types of activation functions of the neural network 600;
fitting the neural network 600 to the defect types 516 in the reference images 500; and
repeating the steps of adjusting the model parameters and fitting the neural network 600, until the model 602 correctly identifies the defect type 516 indicated in the reference defect masks 504.

Clause 4. The method of any of Clauses 1-3, further comprising:
spatially aligning each production defect mask 568 with a digital representation 630 of a region of the course 450 captured in the corresponding production image 566, and resulting in a defect map 632 containing an on-part location 636 and the defect type 516 of each defect 508 associated with the course 450.

Clause 5. The method of any of Clauses 1-4, wherein spatially aligning each production defect mask 568 with the digital representation 630 of the course 450 comprises:
inferring the on-part location 636 of each defect 508 associated with the course 450, based on at least one of the following:
a pixel-wise location of each defect 508 detected by the model 602;
the location of the production layup head 562 relative to the production layup 560 at an image capture time of the production image 566 containing the defect 508; and the location and orientation of the infrared camera 406 relative to the production layup head 562.

Clause 6. The method of any of Clauses 1-4, further comprising:
physically locating, using the defect map 632, one or more of the defects 508 associated with the course 450, and performing at least one of the following:
repairing one or more of the defects 508 prior to applying subsequent courses 450 of the production layup 560; and
adjusting at least one layup process parameter in a manner mitigating subsequent formation of defects 508 of the same defect type 516 at one or more of the defects 508 indicated on the defect map 632.

Clause 7. The method of any of Clauses 1-5, wherein adjusting at least one layup process parameter comprises adjusting at least one of the following:
a travel speed of the production layup head 562 when applying a course 450 onto a substrate 476;
a heat output of a heating device 414 for heating the substrate 476 prior to application of the course 450; and
a compaction pressure of a compaction device 410 compacting the course 450 against the substrate 476.

Clause 8. The method of any of Clauses 1-7, wherein the course 450 is laid up as either a single-width tape 454 or as a plurality of side-by-side tows 456, the step of identifying the defect type 516 of each defect 508 comprises:
identifying a defect 508 as one of the following: a twist, a fold, a gap, an overlap, bridging, puckers, wrinkles, a missing tape or tow, low-quality tack, foreign object debris, a resin ball, a fuzz ball.

Clause 9. The method of any of Clauses 1-8, wherein capturing the reference images 500 comprises:
capturing, using the infrared camera 406, the reference images 500 at a location on the course 450 immediately aft of a compaction device 410 of the reference layup head 404, the compaction device 410 configured to compact the course 450 against a substrate 476.

Clause 10. The method of any of Clauses 1-9, further comprising:
applying, using a heating device 414 of the reference layup head 404, heat 416 to a region of the substrate 476 immediately forward of the compaction device 410.

Clause 11. The method of any of Clauses 1-10, further comprising:
deleting references images 500 that are at least one of the following: off-part images, obstructed-view images, and non-layup-head-movement images.

Clause 12. The method of any of Clauses 1-11, wherein each reference image 500 is comprised of pixels having intensity values, the method further comprising:
preprocessing the reference images 500 in preparation for training the neural network 600, by performing at least one the following:
cropping each reference image 500 to remove non-layup features from the reference image 500; and
normalizing each reference image 500 by centering the intensity values of the pixels of the reference image 500 at a mean pixel value, and rescaling the range of the intensity values of the pixels by a standard deviation.

Clause 13. The method of any of Clauses 1-12, wherein indicating the defect location 510 of each defect 508, comprises one of the following:
forming a defect boundary 511 around each defect 508 in the reference image 500; or color-coding pixels that represent each defect 508 in the reference image 500.

Clause 14. The method of any of Clauses 1-13, wherein generating the reference defect masks 504 is performed using an image-annotation software program.

Clause 15. The method of any of Clauses 1-14, wherein training the neural network 600 to perform segmentation comprises:

training the neural network 600 to perform one of semantic image segmentation or instance segmentation.

Clause 16. The method of any of Clauses 1-15, further comprising:

manually reviewing the production images 566 for defects 508, and generating, for each production image 566 containing a defect 508 detected manually, a reference defect mask 504 indicating the defect location 510 and the defect type 516 of each defect 508 in the production image 566; and inputting the production images 566 and corresponding reference defect masks 504 into the neural network 600 to further train the model 602 for increasing the accuracy of the model 602 in detecting defects 508 in the production images 566 of subsequent courses 450 applied by the production layup head 562.

Clause 17. A method of in-process detection of defects 508 in a composite layup, comprising:

capturing, using one or more infrared cameras 406 of a reference layup head 404, a series of reference images 500 of a course 450 of a reference layup 470 being laid up by the reference layup head 404, the course 450 comprising a plurality of tows 456 in side-by-side relation to each other;

manually reviewing the reference images 500 for defects 508, and generating, for each reference image 500 containing a defect 508, a reference defect mask 504 indicating tow boundaries 458 and a unique tow identification number 462 for each tow 456 in the course 450, and a defect location 510 and identifying a defect type 516 of each defect 508 in the reference image 500;

training, using the reference images 500 and corresponding reference defect masks 504, an artificial neural network 600 to perform instance segmentation in a manner creating a machine learning defect identification model 602 that, given a production image 566 as input, outputs a production defect mask 568 indicating the tow boundaries 458 and tow identification number 462 of each tow 456 in the course 450, and the defect location 510 and the defect type 516 of each defect 508 detected by the model 602;

capturing, using one or more infrared cameras 406 of a production layup head 562, a series of production images 566 of a course 450 of tows 456 of a production layup 560 being laid up by the production layup head 562; and applying the model 602 to the production images 566, and automatically generating, for each production image 566 containing a defect 508, a production defect mask 568 indicating the defect type 516, identifying the defect location 510 along a lengthwise direction of the course 450, and indicating the tow identification number 462 of one or more of the tows 456 containing the defect 508.

Clause 18. The method of Clause 17, further comprising: spatially aligning each production defect mask 568 with a digital representation 630 of a region of the course 450 captured in the corresponding production image 566, and resulting in a defect map 632 containing an on-part location 636 and the defect type 516 of each defect 508 associated with the course 450.

Clause 19. The method of Clause 17 or 18, wherein spatially aligning each production defect mask 568 with the digital representation 630 of the course 450 comprises:

inferring the on-part location 636 of each defect 508 associated with the course 450, based on at least one of the following:

a pixel-wise location of each defect 508 as detected by the model 602;

the tow identification number 462 of one or more of the tows 456 containing the defect 508;

the location of the production layup head 562 relative to the production layup 560 at an image capture time of the production image 566 containing the defect 508; and the location and orientation of the infrared camera 406 relative to the production layup head 562.

Clause 20. A method of in-process mapping of defects 508 in a composite layup, comprising:

manually generating, using an image annotation software program, a reference defect mask 504 for each of a plurality of reference images 500 of a course 450 of a reference layup 470 during application by a reference layup head 404 onto a substrate 476, each reference image 500 showing at least one defect 508 in the course 450;

training, using the reference images 500 and corresponding reference defect masks 504, an artificial neural network 600 to perform instance segmentation in a manner creating a machine learning defect identification model 602 that, given a production image 566 as input, outputs a production defect mask 568 indicating a defect location 510 and a defect type 516 of each defect 508 detected by the model 602;

capturing, using an infrared camera 406 of a production layup head 562, a series of production images 566 of one or more courses 450 of a production layup 560 being laid up by the production layup head 562; and applying the model 602 to the production images 566 in real time to automatically locate and classify defects 508 in the one or more courses 450 of the production layup 560.

Many modifications and other versions and examples of the disclosure will come to mind to one skilled in the art to which this disclosure pertains having the benefit of the teachings presented in the foregoing descriptions and the associated drawings. The versions and examples described herein are meant to be illustrative and are not intended to be limiting or exhaustive. Although specific terms are employed herein, they are used in a generic and descriptive sense only and not for purposes of limitation. Functionally equivalent methods and apparatuses within the scope of the disclosure, in addition to those enumerated herein, are possible from the foregoing descriptions. Such modifications and variations are intended to fall within the scope of the appended claims. The present disclosure is to be limited only by the terms of the appended claims, along with the full scope of equivalents to which such claims are entitled.

What is claimed is:

1. A method of in-process detection of defects in a composite layup, comprising the steps of:

capturing, using an infrared camera of a reference layup head, a series of reference images of a course of a reference layup being laid up by the reference layup head;

manually reviewing the reference images for defects, and generating, for each reference image containing a defect, a reference defect mask indicating a defect location of each defect in the reference image;

training, using the reference images and corresponding reference defect masks, a convolutional neural network to perform segmentation in a manner creating a machine learning defect identification model that, given a production image as input, outputs a production defect mask indicating the defect location and the defect type of each defect detected by the model;

capturing, using an infrared camera of a production layup head, a series of production images of at least one course of a production layup being laid up by the production layup head; and applying the model to the production images, and automatically generating, for each production image containing a defect, the production defect mask indicating the defect location and identifying the defect type of each defect detected by the model;

spatially aligning each production defect mask with a digital representation of a region of the course captured in the corresponding production image, and resulting in a defect map containing an on-part location and the defect type of each defect associated with the course;

inferring the on-part location of each defect associated with the course, based on at least one of the following:
the location of the production layup head relative to the production layup at an image capture time of the production image containing the defect; and
the location and orientation of the infrared camera relative to the production layup head.

2. The method of claim 1, wherein the model parameters comprise at least one of the following:
the quantity of convolution layers and down-sampling layers in an encoder portion of the model architecture;
the quantity of convolution layers and up-sampling layers in a decoder portion of the model architecture;
the size of the reference images that are input into the convolutional neural network; and
the types of activation functions of the convolutional neural network.

3. The method of claim 1, wherein
inferring the on-part location of each defect associated with the course is based on
a pixel-wise location of each defect detected by the model.

4. The method of claim 1, further comprising:
physically locating, using the defect map, one or more of the defects associated with the course, and performing at least one of the following:
repairing one or more of the defects prior to applying subsequent courses of the production layup; and
adjusting at least one layup process parameter in a manner mitigating subsequent formation of defects of the same defect type at one or more of the defects indicated on the defect map.

5. The method of claim 4, wherein adjusting at least one layup process parameter comprises adjusting at least one of the following:
a travel speed of the production layup head when applying a course onto a substrate;
a heat output of a heating device for heating the substrate prior to application of the course; and
a compaction pressure of a compaction device compacting the course against the substrate.

6. The method of claim 1, wherein the course is laid up as either a single-width tape or as a plurality of side-by-side tows, the step of identifying the defect type of each defect comprises:
identifying a defect as one of the following: a twist, a fold, a gap, an overlap, bridging, puckers, wrinkles, a missing tape or tow, low-quality tack, foreign object debris, a resin ball, a fuzz ball.

7. The method of claim 1, wherein capturing the reference images comprises:
capturing, using the infrared camera, the reference images at a location on the course immediately aft of a compaction device of the reference layup head, the compaction device configured to compact the course against a substrate.

8. The method of claim 7, further comprising:
applying, using a heating device of the reference layup head, heat to a region of the substrate immediately forward of the compaction device.

9. The method of claim 1, further comprising:
deleting references images that are at least one of the following: off-part images, obstructed-view images, and non-layup-head-movement images.

10. The method of claim 1, wherein each reference image is comprised of pixels having intensity values, the method further comprising:
preprocessing the reference images in preparation for training the neural network, by performing at least one the following:
cropping each reference image to remove non-layup features from the reference image; and
normalizing each reference image by centering the intensity values of the pixels of the reference image at a mean pixel value, and rescaling the range of the intensity values of the pixels by a standard deviation.

11. The method of claim 1, wherein generating the reference defect masks is performed using an image-annotation software program.

12. The method of claim 1, wherein training the neural network to perform segmentation comprises:
training the neural network to perform one of semantic image segmentation or instance segmentation.

13. The method of claim 1, further comprising:
manually reviewing the production images for defects, and generating, for each production image containing a defect detected manually, a reference defect mask indicating the defect location and the defect type of each defect in the production image; and
inputting the production images and corresponding reference defect masks into the neural network to further train the model for increasing the accuracy of the model in detecting defects in the production images of subsequent courses applied by the production layup head.

14. A method of in-process detection of defects in a composite layup, comprising:
capturing, using one or more infrared cameras of a reference layup head, a series of reference images of a course of a reference layup being laid up by the reference layup head, the course comprising a plurality of tows in side-by-side relation to each other;
manually reviewing the reference images for defects, and generating, for each reference image containing a defect, a reference defect mask indicating tow boundaries and a unique tow identification number for each tow in the course, and identifying a defect type of each defect in the reference image;

training, using the reference images and corresponding reference defect masks, a convolutional neural network to perform instance segmentation in a manner creating a machine learning defect identification model that, given a production image as input, outputs a production defect mask indicating the tow boundaries and tow identification number of each tow in the course, and the defect location and the defect type of each defect detected by the model;

capturing, using one or more infrared cameras of a production layup head, a series of production images of a course of tows of a production layup being laid up by the production layup head; and applying the model to the production images, and automatically generating, for each production image containing a defect, the production defect mask indicating the defect type, identifying the defect location along a lengthwise direction of the course, and indicating the tow identification number of one or more of the tows containing the defect;

spatially aligning each production defect mask with a digital representation of a region of the course captured in the corresponding production image, and resulting in a defect map containing an on-part location and the defect type of each defect associated with the course;

inferring the on-part location of each defect associated with the course, based on at least one of the following:
the tow identification number of one or more of the tows containing the defect;
the location of the production layup head relative to the production layup at an image capture time of the production image containing the defect; and
the location and orientation of the infrared camera relative to the production layup head.

15. The method of claim 14, wherein
inferring the on-part location of each defect associated with the course is based on
a pixel-wise location of each defect as detected by the model.

16. The method of claim 14, further comprising:
physically locating, using the defect map, one or more of the defects associated with the course, and performing at least one of the following:
repairing one or more of the defects prior to applying subsequent courses of the production layup; and
adjusting at least one layup process parameter in a manner mitigating subsequent formation of defects of the same defect type at one or more of the defects indicated on the defect map.

17. The method of claim 16, wherein adjusting at least one layup process parameter comprises adjusting at least one of the following:
a travel speed of the production layup head when applying a course onto a substrate;
a heat output of a heating device for heating the substrate prior to application of the course; and
a compaction pressure of a compaction device compacting the course against the substrate.

18. The method of claim 14, wherein the course is laid up as either a single-width tape or as a plurality of side-by-side tows, the step of identifying the defect type of each defect comprises:
identifying a defect as one of the following: a twist, a fold, a gap, an overlap, bridging, puckers, wrinkles, a missing tape or tow, low-quality tack, foreign object debris, a resin ball, a fuzz ball.

19. A method of in-process mapping of defects in a composite layup, comprising:
manually generating, using an image annotation software program, a reference defect mask for each of a plurality of reference images of a course of a reference layup during application by a reference layup head onto a substrate, each reference image showing at least one defect in the course;

training, using the reference images and corresponding reference defect masks, a convolutional neural network to perform instance segmentation in a manner creating a machine learning defect identification model that, given a production image as input, outputs the production defect mask indicating a defect location and a defect type of each defect detected by the model;

capturing, using an infrared camera of a production layup head, a series of production images of one or more courses of a production layup being laid up by the production layup head; and applying the model to the production images in real time to automatically generate, for each production image containing a defect, the production defect mask indicating the defect location of each defect detected by the model;

spatially aligning each production defect mask with a digital representation of a region of the course captured in the corresponding production image, and resulting in a defect map containing an on-part location of each defect associated with the course;

inferring the on-part location of each defect associated with the course, based on at least one of the following:
the location of the production layup head relative to the production layup at an image capture time of the production image containing the defect; and
the location and orientation of the infrared camera relative to the production layup head.

20. The method of claim 19, wherein the model parameters comprise at least one of the following:
the quantity of convolution layers and down-sampling layers in an encoder portion of the model architecture;
the quantity of convolution layers and up-sampling layers in a decoder portion of the model architecture;
the size of the reference images that are input into the convolutional neural network; and
the types of activation functions of the convolutional neural network.

* * * * *